(12) United States Patent
Larsson

(10) Patent No.: US 6,467,085 B2
(45) Date of Patent: *Oct. 15, 2002

(54) SYSTEM AND METHOD FOR REDUCING COUPLING IN AN OBJECT-ORIENTED PROGRAMMING ENVIRONMENT

(75) Inventor: Tony Ingemar Larsson, Stockholm (SE)

(73) Assignee: Telefonaktiebolaget L M Ericsson (Publ) (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/354,810
(22) Filed: Jul. 16, 1999

(65) Prior Publication Data
US 2002/0029378 A1 Mar. 7, 2002

Related U.S. Application Data

(63) Continuation of application No. 08/723,107, filed on Sep. 30, 1996, now abandoned.
(60) Provisional application No. 60/005,337, filed on Oct. 17, 1995.

(51) Int. Cl.$^7$ .................................................. G06F 9/45
(52) U.S. Cl. ......................... 717/165; 709/223; 709/303
(58) Field of Search .................... 717/10, 165; 709/223, 709/303; 707/200–253, 103; 345/804–805

(56) References Cited

U.S. PATENT DOCUMENTS

| 5,297,285 A | | 3/1994 | Abrahamsson et al. ...... 395/700 |
| 5,339,430 A | | 8/1994 | Lundin et al. ............... 717/162 |
| 5,367,635 A | * | 11/1994 | Bauer et al. ................. 709/221 |
| 5,388,264 A | * | 2/1995 | Tobins, II et al. ........... 707/103 |

(List continued on next page.)

OTHER PUBLICATIONS

Walter Widl and Kidane Woldegiorgis, *In Search of Managed Objects,* Ericsson Review No. 1–2, pp. 34–56, 1992.

Douglas C. Schmidt, A C++ *Wrapper for Unix I/O Multiplexing: The Object–Oriented Design and Implementation of Reactor,* C++ Report, Sep. 1993, pp. 32–43 (Doc. No. XP 000564824).

*Primary Examiner*—Tuan Q. Dam
*Assistant Examiner*—John Q. Chavis
(74) *Attorney, Agent, or Firm*—Jenkens & Gilchrist, A Professional Corporation

(57) ABSTRACT

The principal impediment to achieving interoperability, modifiability, implementation-independence and the reuse of object-oriented software components is the strong coupling between objects. The preferred solution to this problem involves adding an output port to each object and further making this additional output port part of a new software development approach that is an extension of the object-orientation paradigm. The resulting component-oriented software development environment provides the level of indirect addressing that is needed to manage the design requirements of interoperability, modifiability and implementation-independency. Another solution to the decoupling problem includes requiring each object to address other objects only indirectly, such as by using specific interface objects. Several variants of this technique have been detailed, described and compared in this patent application. Each of these techniques may be applied in different parts, or at different levels, of a software system.

10 Claims, 27 Drawing Sheets

U.S. PATENT DOCUMENTS

| | | | | |
|---|---|---|---|---|
| 5,423,043 A | * | 6/1995 | Fitzpatrick et al. | 709/303 |
| 5,452,433 A | * | 9/1995 | Nihart et al. | 709/223 |
| 5,481,721 A | * | 1/1996 | Serlet et al. | 709/303 |
| 5,485,617 A | | 1/1996 | Stutz et al. | 709/315 |
| 5,519,875 A | * | 5/1996 | Yokoyama et al. | 709/303 |
| 5,530,859 A | * | 6/1996 | Tobins, II et al. | 713/400 |
| 5,574,903 A | * | 11/1996 | Szymanski et al. | 707/1 |
| 5,734,904 A | * | 3/1998 | Kanamori et al. | 709/305 |
| 5,734,905 A | * | 3/1998 | Oppenheim | 709/300 |
| 5,796,396 A | * | 8/1998 | Rich | 345/332 |
| 5,848,291 A | * | 12/1998 | Milne et al. | 345/302 |
| 5,936,643 A | * | 8/1999 | Tindell et al. | 345/512 |
| 6,173,289 B1 | * | 1/2001 | Sonderegger et al. | 707/103 |

* cited by examiner

SYSTEM AND METHOD FOR REDUCING COUPLING IN AN OBJECT-ORIENTED PROGRAMMING ENVIRONMENT

PRIORITY UNDER 35 U.S.C. §119(e) & 37 C.F.R. §1.78(a) (1)

This Application is a Continuation of application Ser. No. 08/723,107 filed Sep. 30, 1996 now abandoned.

This Nonprovisional U.S. Patent Application claims priority from Provisional U.S. Patent Application entitled Component Decoupling, a Key to Improving Software System Architetures, Ser. No. 60/005,337, filed on Oct. 17, 1995 in the name of Tony I. Larsson, the inventor of the present application. The earlier-filed Provisional Patent Application is currently pending and has not been abandoned.

CROSS REFERENCES TO RELATED APPLICATIONS

This Nonprovisional U.S. Patent Application is based upon an earlier-filed, currently pending Provisional U.S. Patent Application entitled Component Decoupling, a Key to Improving Software System Architectures, Serial No. 60/005,337, filed on Oct. 17, 1995, in the name of Tony I. Larsson, the inventor of the present application.

This Nonprovisional U.S. Patent Application also contains subject matter related to an earlier-filed, currently nonabandoned Provisional U.S. Patent Application entitled System and Method for Decreasing Coupling between Functions and Actual Data Types, Serial No. 60/005,497, filed on Oct. 16, 1995, in the names of Peter Kriens, Stefan Eissing and Håkan Björk. This currently-pending Provisional U.S. Patent Application and any Nonprovisional Patent Applications deriving therefrom in the United States or in other countries and the disclosure(s) contained therein are all hereby incorporated by reference herein.

The earlier-filed Provisional U.S. Patent Applications identified above and the present Nonprovisional U.S. Patent Application have all been or will be assigned to Telefonaktiebolaget LM Ericsson (publ).

DESCRIPTION

1. Technical Field of the Invention

The invention relates to the field of computer programming languages, methodologies and systems and more particularly, to a system and method for reducing programming and execution inefficiencies caused by coupling between objects in an object-oriented programming and execution environment, such as a telecommunications environment.

2. Description of Related Art

Object-orientation has often been advocated as the panacea for designers of software systems. However, in order to fulfill basic architectural requirements, large software systems still need additional means for decoupling their components. The component decoupling techniques disclosed and described in this patent application can also be used to design and develop efficient distributed software solutions that use open standards.

The term object-orientation is used to describe a variety of programming concepts and advances. At its core, the term object-orientation is usually taken by those of ordinary skill in the art to refer to a computer programming environment that has three principal characteristics. First, communication between various objects in such an environment is performed by passing messages. Second, such programming environments distinguish between data types and instances of those data types. Third, the similarities between various objects in such environments is characterized using the concept of inheritance.

Some of the limitations of the object-oriented approach as presently implemented in various software programming systems can be best understood by considering first the history and roots of the object-oriented approach.

We have moved from the function-oriented approach used in the early days of software programming to the object-oriented approach of today. Function-oriented analysis was (and is) based on a top-down (or black box) view of system requirements. In real-time applications such as telecommunications, such an analysis focuses on the functions or services provided to external clients and is implemented as processes that are distributed over a telecommunications network.

In contrast, software engineers often focus on algorithm control structures, on data structures and on data transformation methods. In the function-oriented approach, as understood by skilled software engineers, data is usually considered as being global, although in some instances data maybe encapsulated. Consequently every change in the representational format of a datum immediately feeds back into the design of every function that manipulates that datum.

This disadvantage can be ameliorated somewhat, by manipulating the data indirectly, i.e., by manipulating the data symbolically or by using a specialized interface function that serves as a filter. The use of such interface functions can also permit modification of the representational format of the data and can be used to obtain an abstract view of the data. Thus, choice of a proper software architecture model can avoid or eliminate many of the problems that are often associated with the function-oriented approach to software design.

The function-oriented approach is most commonly used nowadays to manipulate information contained in databases. Each database management software program often uses an abstract information model that isolates the data representation from its manipulation. However, the internal structure of the database is not accessible to an end-user who invokes standard functions to manipulate the information contained in the database.

In contrast to the function-oriented approach which focuses on functions that transform or manipulate external or global data, the object-oriented approach advocates an inverted, more structure-oriented or implementation-oriented view of the world, that focuses on objects that in turn are represented by data and applicable functions.

This approach, which is achieved by separating the function-naming parts of messages (including their intended interpretation) from the implementations of the functions, makes it possible to encapsulate and hide the data representations that are used in a specific implementation. Thus, this approach requires both the message-names as well as their meaning (which constitute the communications means between objects) to have stable definitions.

The encapsulation of certain information in distinct system entities that communicate amongst each other through signals has been a common approach amongst many telecommunications software designers and programmers. This approach has been used in order to handle system components in a coherent way that is independent of their physical location and implementation. In this telecommunications software engineering paradigm, a function at the system level is implemented by the interworking of different system components each containing some of the necessary parts of the function being implemented, including the related data.

The object-oriented programming paradigm has its roots in programming languages like SIMULA, a programming language created for simulation and modeling, in programming languages such as SDL, CHILL and PLEX that have been used for developing telecommunications applications where system modeling, component encapsulation and message-based communication have been essential features and also in hardware description languages (HDLs).

In traditional object-oriented analysis both the components of an artifact system and its environment are modeled as a set of objects that are characterized by common and individual attributes, relationships, means of communication and operations. Consequently the design of an object-oriented software system can be improved only by putting in the effort needed to capture, analyze, formalize and validate the concepts and structures that are used to build an abstract model of the proposed software system including its environment and intended use.

The environment of each object usually consists of other objects that use (or are used by) the object under consideration. Invoking objects are usually referred to as "clients" while invoked objects are usually referred to as "servers". Consequently, the intended use of an object should be taken into account in designing the means of communication with the object and upon the mechanisms used to execute the desired operations that are to be carried out upon the object in question.

Objects are characterized by their attributes, attribute values and functions (which are also referred to by those of ordinary skill in the art as actions, methods, operations or services). A set of objects that possesses the same attributes (e.g., name, weight, height, etc.) and functions is referred to as an object class (or type). In a pure object-oriented model, attributes (e.g., the class of integers or the class of subscribers) are relationships to values that are objects of a particular class. Functions can be classified into access functions and manipulation functions.

In every software programming environment, it has been found to be important to create mechanisms that clarify the relationship of an object to other objects having common or similar characteristics. One kind of classification, often referred to as inheritance, is commonly achieved by relating each (specific) object to one or more general objects as shown in FIG. 1.

For example, the object "john smith" 121 may be classified by relating it to the object class "male_person" 111 by an attribute or relationship called "class". This type of relationship is usually indicated in a programming language by using the declarative prefix "kind_of," "specialization_of," "member_of," or "instance_of," etc. The class "male_person" 111 may be further related to a more general class called "person" 101 and so on as shown in FIG. 1. Thus, the class "male-person" 111 is an instance of the super class "person" 101 while the object "john_smith" 121 is an instance of the class "male_person" 111.

The notion of inheritance attempts to identify common denominators or invariant parts of an object domain and permits reuse of some of the invariant characteristics by referring each specialized object to a generic object class.

The relationship between objects can also be constructed from the bottom up using the composition hierarchy. Thus objects may also be characterized as being "composed of" more primitive components that are also objects. In general each object can be implemented as a combination of one or more general parts that are complemented by zero or more specific parts. Although there are implementational variations arising from the use of either a class hierarchy or a composition hierarchy, such differences will not be discussed at greater length in this patent application.

It should be noted that class hierarchies and the composition hierarchies are only the principal (but not the exclusive) mechanism for describing the inter-relationships between the objects in an application environment. In the cooperative model of objects, which builds upon the composition model, a message-passing mechanism is used by each object to delegate the execution of general functionality to a general part of the object while retaining control of specific functionality within specific internal functions or methods. The coupling between different objects is more directly visible in the cooperation model than it is in the inheritance model because coupling resulting from inheritance is easier to trace in the former model than the latter.

The object-oriented programming paradigm has become increasingly popular because of the perception that it increases the reusability of software programs. However, it is important to consider the extent to which an architecture is prepared for known and unknown application domains. The analysis, description and construction of a family of generalized system components that may be reused and modified later in a different context is a worthwhile investment only if the need for such reusable components is real. Further, it always takes time to find the common, important and invariant denominators of an entire applications domain and to package them in a way that facilitates reuse and modification in a simple manner.

Thus an important part of the requirement analysis that needs to precede the design of reusable objects must involve decisions about whether it is worthwhile to generalize and prepare a solution for reuse once it has been found. Failure to conduct such an analysis, however, invites failure in either the short term or the long term.

In the object-oriented approach, both control and data are passed between objects as messages. Thus the control flow and data flow structures are projections of the message flow structure. The use of messages rather than direct communication is an important means for decoupling various parts of the software program.

In the object-oriented approach, no object is permitted direct access to the information provided by other objects. Further, each object may interpret messages in its own way and can therefore modify the standard meaning of a message. However, in order to keep the total number of message types within reasonable bounds, this ability to modify messages is used in practice only to perform minor adaptations of the standard meaning of the message or to deal with implementational variations. Without such constraints on the semantics of a message, the benefits of polymorphism would either get lost or at least get significantly reduced. It should be noted that the term "polymorphism" as used here refers to the ability to use a limited number of message types.

In practical terms, the basic meaning (i.e., the semantics) of a message needs to be defined and its encoding (i.e., the syntax) cannot be changed without changing the internal structure of every recipient object. Thus, in order to maintain communications between various objects, the basic meaning and encoding of various messages need to remain stable over time. Consequently some of the problems associated with the data representation model can also inhere in the message representation model.

A well-designed object-oriented analysis method needs to provide the means to find a stable but extendable base of messages. Such a common base of message definitions can be used to provide a virtual address space that can make communications feasible among objects or processes running on different processors.

Functions that are implemented at higher system levels often include (or are based on) the cooperation between several subfunctions provided by objects at lower levels in the system. When such higher-level functions are executed, specific messages are triggered that cause the execution of object-specific subfunctions.

Since every function is triggered by the reception of one or more messages, it is possible to chart the behavior of a function by depicting the set of possible uses (or possible invocations) of a function. This is often done using an interworking diagram, as shown in FIG. 2. An interworking diagram is also referred to by those skilled in the art as an object-interaction sequence, message-passing sequence or timing diagram. Sometimes, such a diagram is rotated 90° so that the time-axis becomes vertical.

FIG. 2 shows three objects $o_1$ 201, $o_2$ 202 and $o_3$ 203. Object $o_1$ 201 has three functions (or methods) defined within it: $f_{11}$, 211, $f_{12}$ 212 and $f_{13}$ 213. The object $o_2$ 202 contains two functions, $f_{21}$ 214 and $f_{22}$ 215. The object $o_3$ 203 contains the function $f_{31}$ 216. The three objects $o_1$ 201, $o_2$ 202 and $o_3$ 203 cooperate by exchanging messages amongst each other. These are shown as messages $m_1$ 221, $m_2$ 222, $m_3$ 223, $m_4$ 224, $m_5$ 225 and $m_6$ 226 in FIG. 2.

Thus the invocation of function $f_{11}$ 211 in object $o_1$ 201 causes it to send a message $m_1$ 221 to function $f_{21}$ 214 in object $o_2$ 202 which in turn may either send a message $m_2$ 222 to function $f_{12}$ 212 in object $o_1$ 201 or a message $m_3$ 223 to function $f_{31}$ 216 in object $o_3$ 203. In the former case, function $f_{12}$ 212 will further send a message $m_4$ 224 to function $f_{22}$ 215 in object $o_2$ 202 causing it in turn to issue message $m_5$ 225 to function $f_{13}$ 213 in object $o_1$ 201. In the later case, the receipt of message $m_3$ 223 by function $f_{31}$ 216 causes it to issue message $m_6$ 226 to function $f_{31}$ 213 in object $o_1$ 201.

In constructing an interworking diagram it is always assumed that the starting point (or initial state) of each object is known to the system. By identifying and analyzing the most important uses (or function invocation flows), we can identify certain common denominators. These in turn, can be used to help define functions and objects that have greater generality.

Each attribute of an object that changes over time reflects some characteristic of an object's overall state. Persons of ordinary skill in the art usually begin by identifying an attribute that controls all communications with the object. This attribute is commonly termed the control state variable.

The control state variable changes its value (its state) only when an object's response to a subsequent message needs to be different from its response to the last message received by it. Whenever this is the case, the object undergoes a control state transition that reflects important changes to the object from the viewpoint of other program modules and units that invoke the object in question.

Although a state-oriented view for dealing with dynamic behavior is not necessarily part of the basic object-oriented paradigm, it has been found by those of ordinary skill in the art to constitute good practice if state transitions are also considered during the design phase of a software system, especially in real-time applications such as telecommunications.

The current object-orientation paradigm suffers from several problems. The first of these is the likelihood of excessive coupling between objects. Such excessive coupling often arises due to direct references by some objects to other serving objects via messages as well as via class structures and/or object structures. Another problem with the present paradigm is the lack of a deterministic solution for minimizing the amount of coupling between objects and/or subsystems and the lack of a suitable decomposition technique for the same purpose.

A central problem with the present object-orientation paradigm is that objects are well-protected only from external misuse. Currently some measure of decoupling can be achieved by using a message dispatch function that works as an input port for each object as shown in FIG. 3.

FIG. 3 shows an object $o_1$ 300 having an input port $p_1$ 301 and containing two functions (or methods) $f_1$ 311 and $f_2$ 312 that modify, manipulate, or transform two attribute values, $v_1$ 321 and $v_2$ 322. The role of the input port $p_1$ 301 is to decouple the accesses (or invocations) of the functions $f_1$ 311 and $f_2$ 312 from their implementations by using an externally-published function-name in the invoking message.

Thus the input port $p_1$ 301 serves as an attribute-value or function-name dispatch function. However, this technique of decoupling does not prevent problems arising from an object being dependent on other objects that it invokes. Thus, changes to object $o_1$ 300 may influence all other objects invoked by it since each object is often linked to many other objects as shown in FIG. 4.

FIG. 4 illustrates the strong coupling between objects that arise from message links between various objects. Four objects $o_1$ 401, $o_2$ 402, $o_3$ 403 and $o_4$ 404 are shown in FIG. 4. Thus, the invocations of object $o_1$ 401 may cause its functions $f_{11}$ 411, $f_{12}$ 412 and $f_{13}$ 413 to invoke in turn objects $o_2$ 402, $o_3$ 403 and $o_4$ 404 as shown in the figure. Likewise, the invocation of object $o_2$ 402 causes its functions $f_{21}$ 421 and $f_{22}$ 422 to invoke inter alia, object $o$ $40_4 4$. Likewise the invocation of object $o_3$ 403 causes its functions $f_{31}$ 431, $f_{32}$ 432 and $f_{33}$ 433 to invoke inter alia, object $o_4$ 404.

Analogously, as shown in FIG. 4, the invocation of object $o_4$ 404 causes its functions $f_{41}$ 441 and $f_{42}$ 442 to invoke objects $o_2$ 402 and $o_3$ 403. Thus changes in the internal structure of object $o_1$ 401 will impact upon the operation of objects $o_2$ 402, $o_3$ 403 and $o_4$ 404.

This illustrates an important structuring guideline that can be used to decrease the coupling between objects and improve the operation of object-oriented software programs, namely, that it is important to isolate elements that change frequently from other elements that remain relatively stable over long periods of time.

As can be seen from the above description, current attempts to standardize the design and development of computer software have focused only on high-level standardization efforts. However, in order to provide a design base that can respond to market needs and economic constraints, software systems and their components need to be flexible and reusable. Consequently, it has been found desirable that software architectures support interoperability, modifiability and implementation-independence over long periods of time.

A good system architecture therefore needs to be based on a definitive conceptual design that incorporates knowledge about the requirements that will be imposed upon the system. Consequently, important elements of the architecture including paradigms, interfaces, naming rules, messaging schemes, addressing schemes, key components, structure, layers, function decomposition principles, design rules and support tools must be selected in advance in such a manner as to maximize their consistency, simplicity, uniformity and orthogonality.

Piece-meal improvement of an existing architecture cannot always suffice, as an existing architecture may lack a consistent architecture or framework of system interfaces; different applications might be incompatible; industry standards might not have been adhered to; or the accumulated sum of new customer requirements might necessitate the design and development of a new software architecture model.

In order to improve the architecture of a software system, one first needs to understand the problems that arise from the present object-orientation paradigm. Knowledge of the underlying problems can help make new designs more modifiable, inter-operable and implementation-independent.

SUMMARY OF THE INVENTION

Therefore it is a primary object of the present invention to permit the decoupling amongst objects in an object-oriented programming environment at every level using standardized interfaces wherever possible. It is a further object of the present invention to determine the decoupling principles based upon considerations of performance and flexibility and upon economic constraints.

It is also an object of the present invention to complement the work within standard-setting bodies in the telecommunications arena such as the International Telecommunications Union (ITU), the Open Systems Interconnection (OSI), the Open Software Foundation (OSF) and the Object Management Group (OMG) for the development of open, distributed and interoperable software system architectures. This can make it easier for businesses to operate externally-developed standard application software interchangeably with software products that are developed in house.

A method for reducing the coupling between objects in an object-oriented programming environment is described. The programming environment comprises a computer system containing a processing unit, a memory unit, an I/O (input/output) unit and an operating system. A group of objects is first created, each of them having at least one input port. In the preferred embodiment, each object additionally contains an output port also. The input and output ports may be implemented as separate program units or as an integrated program unit.

Two or more of the group of objects are selectively combined to create one or more software program modules. The software modules are linked to each other and to the operating system of the computer to create an executable software application program. The software application program is executed on the computer system, with all invocations of an object in the software application program being processed through the input port of the object.

Furthermore, in the preferred embodiment of the present invention, all interactions of an application program object with other objects, other application programs or with the operating system of the computer are routed through the output port of the object. Alternatively, all object interactions are indirect, via interface objects such as a centralized switch object, through an agent object, or an object responding like either a centralized switch object or an agent object.

BRIEF DESCRIPTION OF THE DRAWINGS

A more complete understanding of the method and system of the present invention may be obtained by reference of the detailed description of the preferred embodiments that follow, taken in conjunction with the accompanying drawings, wherein.

DESCRIPTION OF THE PREFERRED EMBODIMENT

Component Orientation

A software system comprises a set of components that cooperate to achieve a common goal or effect. In many instances, the components of a software system are themselves systems. Consequently, in describing or modeling a product, it has been found to be very useful if one were able to switch between a component-oriented and a system-oriented perspective.

In a component-oriented analysis, a software-system is viewed top-down as being a single component from a functional perspective and viewed bottom-up as being a set of coupled (and sometimes physically distributed) components. In the system-oriented approach, each component may it-self be a system at a lower level. In such an analysis, communication between components is permitted only through predefined interfaces, couplings, communications channels or ports.

The first task in a component-oriented analysis is therefore to identify the users of each component in order to understand the greatest use of the component being analyzed and its overall behavior. Additionally, one needs to determine whether clients invoking a component need access ports to that component or to other components or systems. The next task in the analysis is to identify all possible implementations of each component and to determine the individual behavior of each component and its coupling with other components. Such an analysis can be helpful in the design of entirely new systems, in the modification of existing systems or permit the reuse of components in a concurrent software engineering environment.

Figure 8:
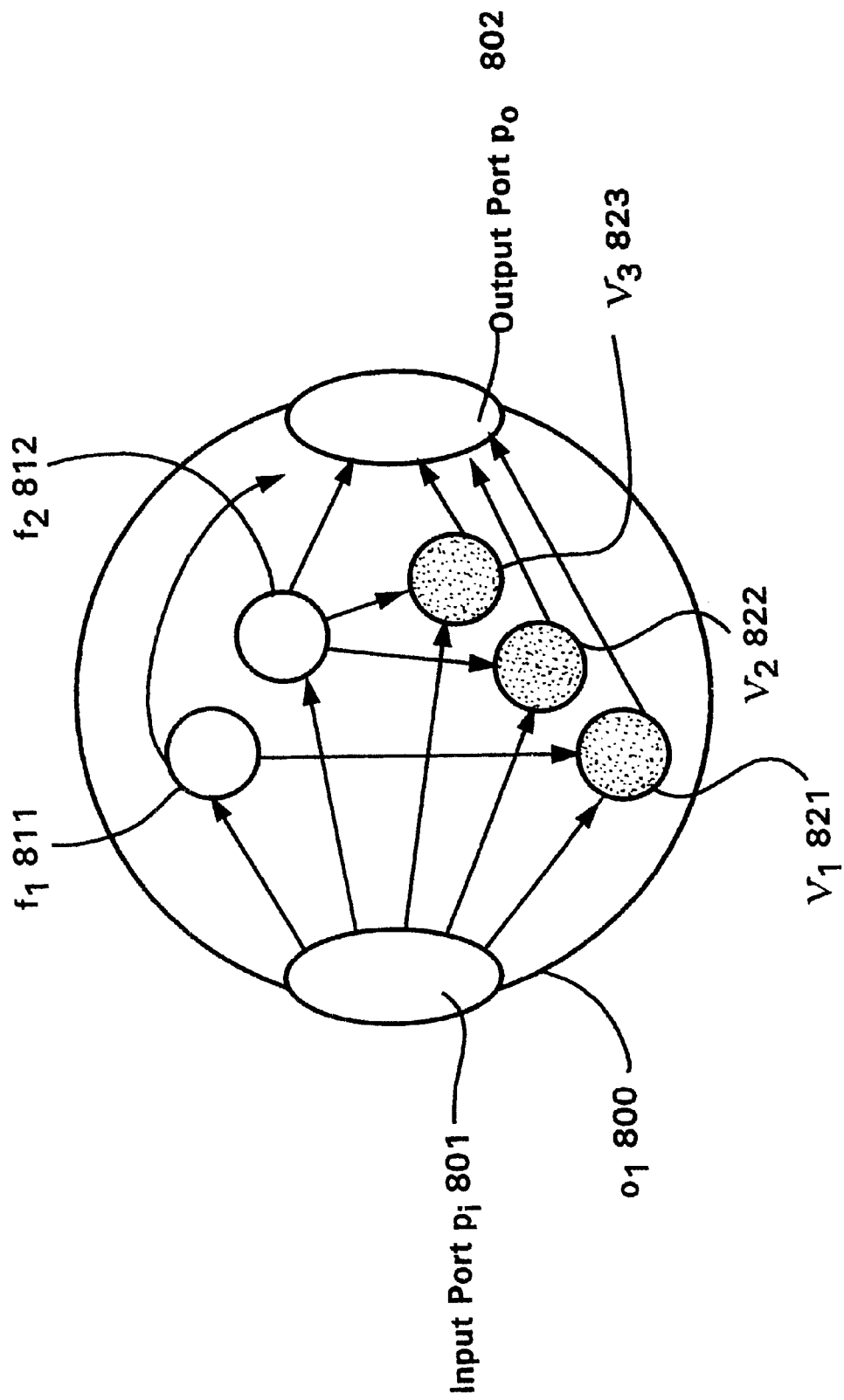
FIG. 8 shows the preferred embodiment of the present invention where every object has both an input port as well as an output port.

In one embodiment of the present invention shown in FIG. 8 and the accompanying description, each object is encapsulated and is permitted to access or communicate with other objects only through established input and output ports. Such a pure component-oriented software engineering approach differs from the traditional object-oriented approach in having an output port to regulate all outward-directed communications from an object. This additional regulation and protection of outward-directed communications need not be hard-wired into each object itself, but can instead be implemented using additional software constructs as detailed later in this patent application.

Such an approach ameliorates some of the disadvantages of the existing object-oriented approach by reducing the coupling between components. The object-oriented approach has been claimed to permit the design of "software ICs (Integrated Circuits)" see, e.g., Brad J. Cox, Object-Oriented Programming: an Evolutionary Approach 70–71 (ISBN 0-201-10393-1, Addison-Wesley 1986). However, in practice it has been found that any such software ICs realized using the existing object-oriented software programming paradigm are too dependent upon other objects because it has been tailored for a specific environment. Consequently, in order to obtain reusable components, one has to aim for more generic solutions to software design problems.

The decoupling of software components or elements by the use of output ports is one of the basic building blocks of the component-oriented paradigm that is the subject matter of the present patent application. This technique improves upon, and complements, the current object-oriented software programming paradigm.

In the preferred embodiment of the present invention shown in FIG. 8 and the accompanying description, the decoupling of objects using output ports is implemented by introducing specific "decoupling objects" whose role is to act as output ports or name switches. This is detailed elsewhere in this patent application. When a decoupling object receives a message m, it redistributes the message m to one or more coupled receivers.

In one implementation of the present invention, if we assume that there is one output port for every abstract server object, the decoupling object triggers an action of the form "on receiving any message m send message m to receivers $r_{c1}, r_{c2}, \ldots r_{cn}$ where $r_{c1}, r_{c2}, \ldots r_{cn}$" are the names of receiving objects for the specified message. In another implementation of the present invention, a single output port is used, whose behavior can be characterized as "on receiving a message m to an abstract receiver $r_{ai}$, send message m to receivers $r_{c1}, r_{c2}, \ldots r_{cn}$".

However, it should be noted that even by using a decoupling object we cannot solve all of the problems that plague the present object-oriented software programming paradigm. For example, the use of decoupling objects does not prevent objects from direct communications with other objects even where such communications are prohibited by a software programming standard such as the one proposed here.

If full component generality and reusability is to be achieved then the coupling information must not be built in to the various components but must instead be provided by coupling ports either at the time of instantiation, or (dynamically) during active invocation (use) of the component.

Further, the partitioning of a system into components or subsystems needs to be based upon a rigorous analysis of the static and dynamic couplings between the components involved, i.e., between the types and the instances of different variables. Other important factors that may also influence the system partitioning are the physical and performance-related locational and distribution constraints.

In order to be useful in real-time applications, the component-oriented software programming technique described in the present patent application also needs to permit each object to simultaneously observe and change the states of other objects. Further, each object must also include means for specifying the synchronous activation of multiple objects for the performance of concurrent actions. Without such a capability, the act of observation of an object may itself influence the states of other objects—making it impossible to observe either a system's state or change of state.

It should be noted that there are no significant barriers in the object-oriented paradigm that prevent or limit the inclusion of mechanisms to specify either real-time or simulated real-time behavior. The addition of features for the specification of reactive concurrent behavior can result in an upgraded object-oriented paradigm that better supports the design of open systems.

However, it should also be noted that most object-oriented programming languages and environments of the present day are sequential or single-threaded and thus have no built-in support for handling real-time phenomena like concurrent actions or processes. Consequently, operating system level mechanisms are necessary for achieving an equivalent effect.

Improving Object Decoupling

The present patent application describes several techniques to limit the problems associated with the traditional object-oriented programming approach. The solutions suggested in this patent application generally fall into two classes.

The first class of solutions can be characterized as methods that support the definition of stable object- and function-partitionings that result in the meaning and encoding of messages remaining stable over relatively long periods of time. These methods comprise various techniques for efficient partitioning of the problem space to improve programming efficiency. The second class of solutions regulate the identification of objects and communication between an object and other objects, by introducing a mechanism that adds an extra level of indirectness to inter-object communications. These implementational techniques are also useful for improving programming efficiency.

Object Classification

As explained earlier, it is very important to find stable object classes. Several methods of analysis can be used for this purpose. As part of such an analysis, the attributes and functions that characterize each object class and the relationships between various objects need to be defined. In one embodiment of the present invention, a hierarchical approach is used to limit the number of objects in view at each level of the hierarchy.

Minimizing the Object-Attribute-Function Space

In another embodiment of the present invention, which belongs to the first class of solutions of improving object decoupling messages are used as interfaces for functions and attributes. Each such interface consists of a function name and an optional set of attribute value pairs. If an analysis of an application domain yields a normal stable set of object classes that are characterized by a reasonably orthogonal set of attributes and functions, it becomes possible to define both the meaning of a set of messages as well as a message-encoding technique that is both stable and extensible.

It has been found in practice that an analysis of one or more object classes will often show a set of closely related functions to have common or shared elements in their meanings. Consequently, the set of messages used can be significantly smaller than the total set of functions using the messages. A similar analysis technique can also be applied to the attribute name space. Furthermore, it may also be possible to unify two or more of the object classes using a similar ordering technique.

Figure 1:
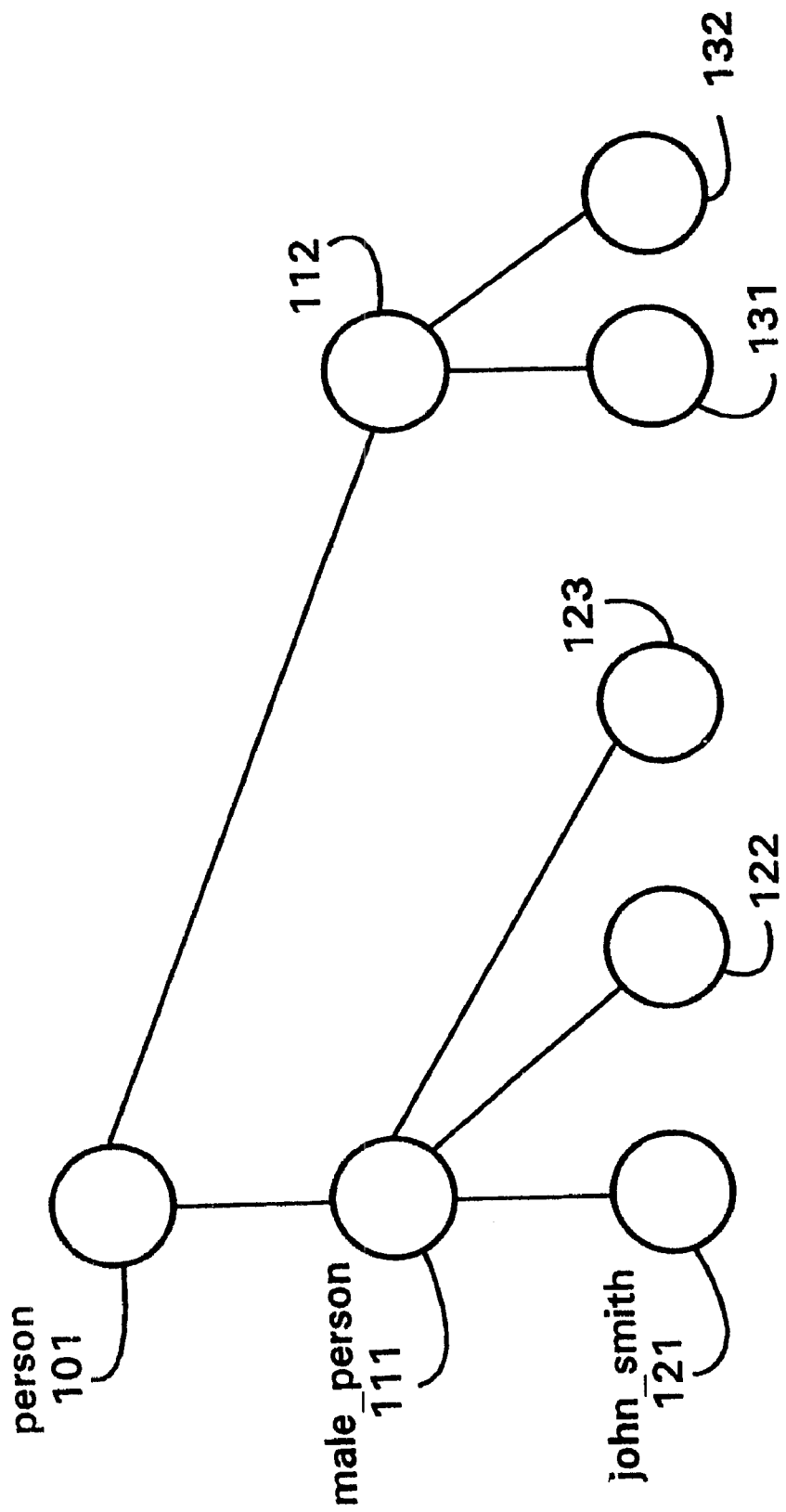
FIG. 1 is an illustrative diagram showing the hierarchy of an exemplary object class.
Figure 2:
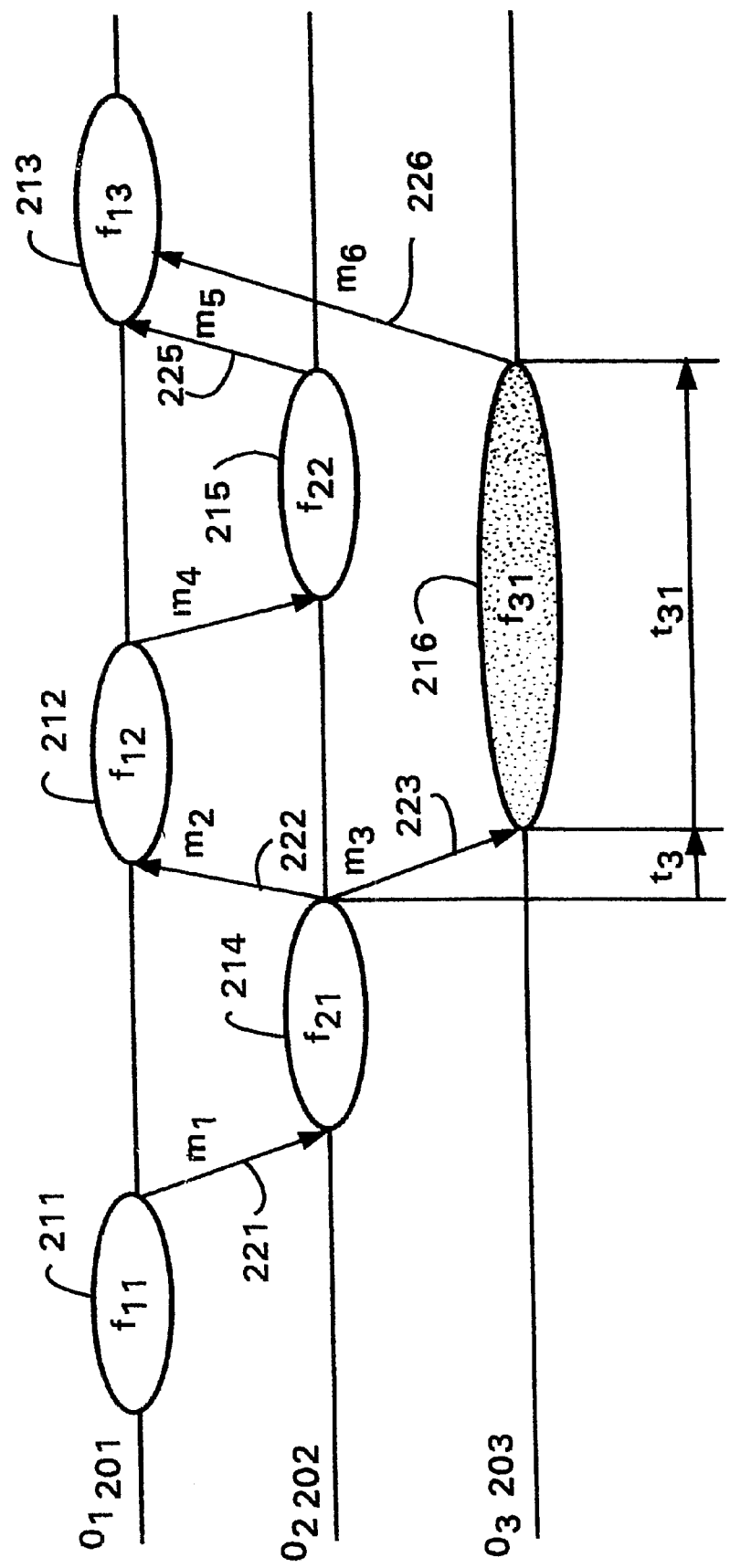
FIG. 2 is an illustrative interworking diagram showing a time history of the interaction between the functions or methods in various objects in a system.
Figure 3:
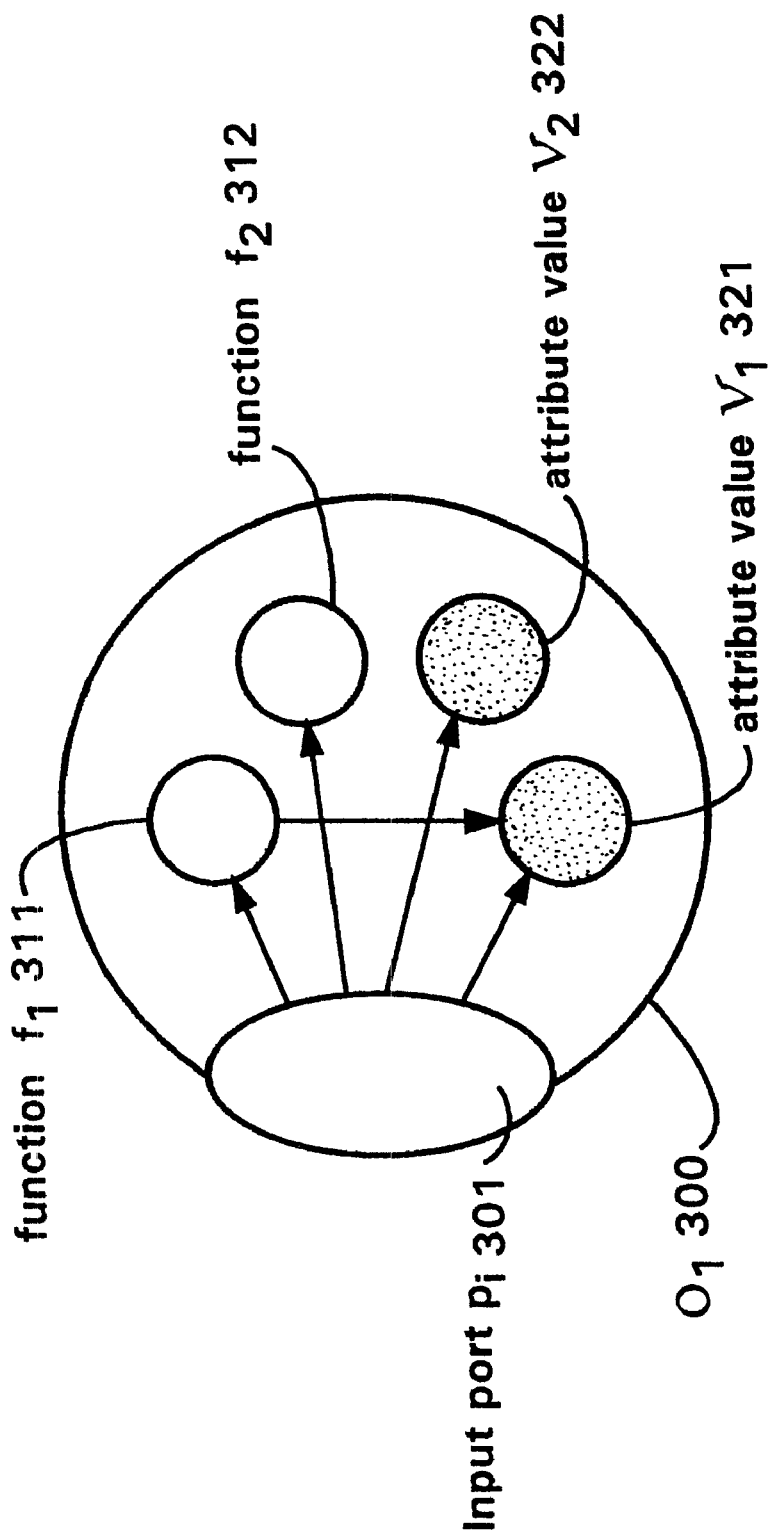
FIG. 3 shows an exemplary embodiment of the traditional object-oriented paradigm where each object has an input port that functions as a message dispatch function.
Figure 4:
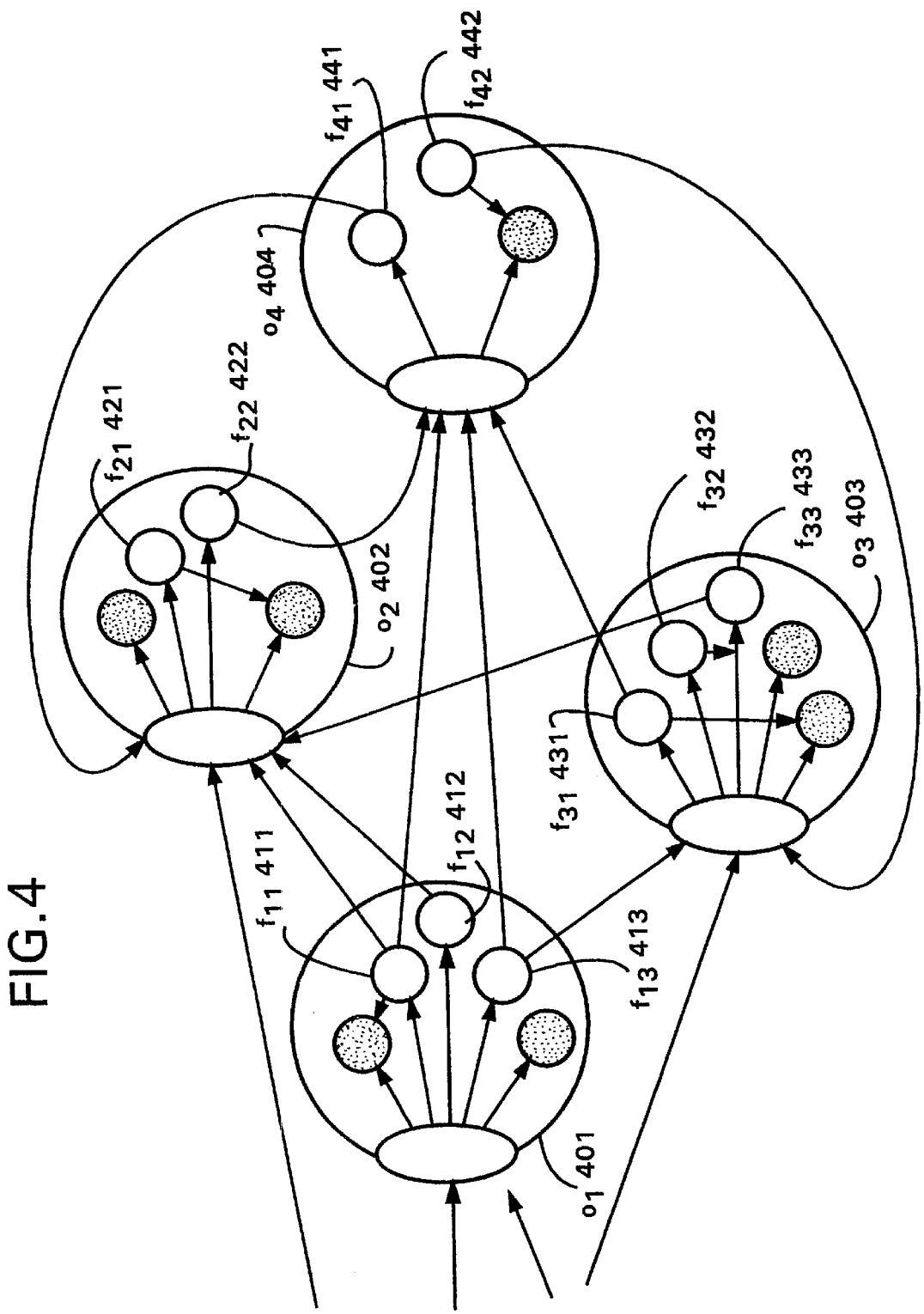
FIG. 4 illustrates the strong coupling between objects arising from the message links between various objects in a system.
Figure 5:
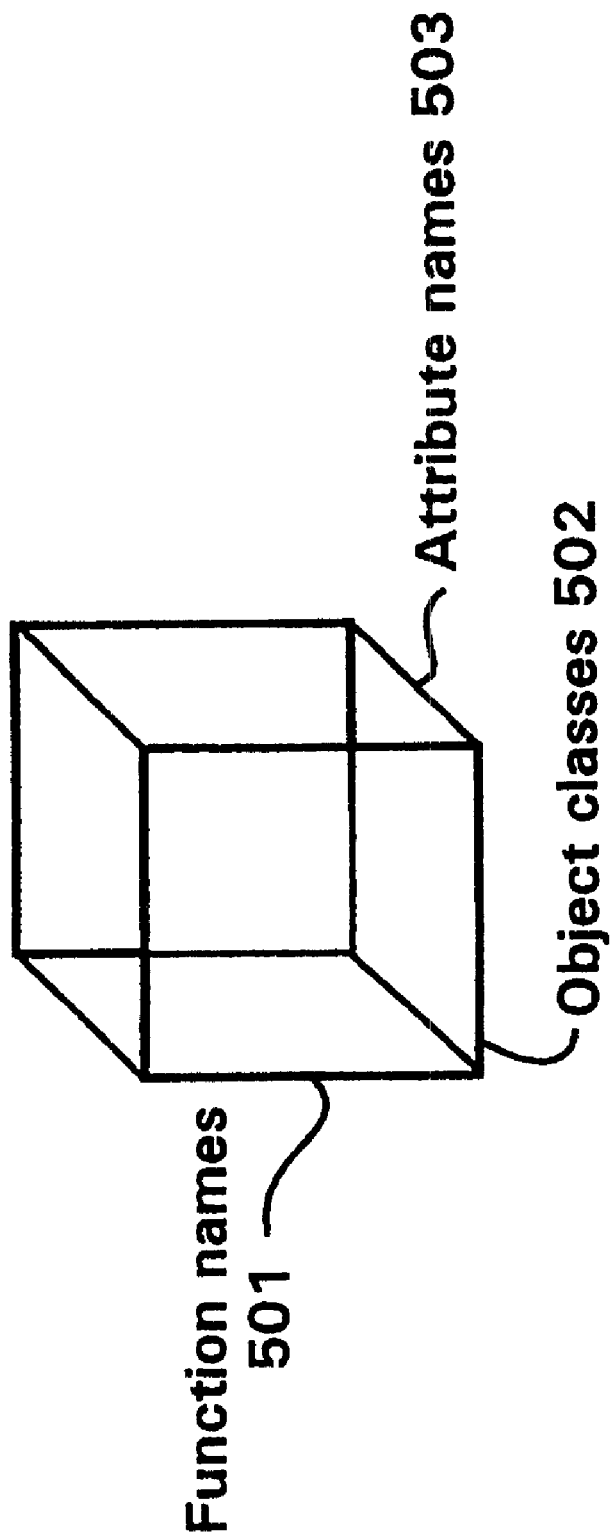
FIG. 5 depicts the object-attribute-function space in three dimensions.

As shown in FIG. 5 this minimization effort can be visualized as attempting to reduce the volume of a three-dimensional space whose axes represent function names 501, object classes 502 and attribute names 503. Needless to say, the minimization effort must still generate a feasible solution, i.e. the solution must lie within the minimized object-attribute-function solution space.

Communication Using a Centralized Switch Object

In yet another embodiment of the present invention, the desired object decoupling is obtained by routing communications between peer objects (or between client objects and server objects) through a specialized object operating as a centralized switch. This technique which falls into the second class of problem solutions is principally an alternative to the preferred embodiment using output ports that is described later in this application. However it should be noted that it is possible to use the centralized switch object concept in conjunction with the output part concept that is part of the preferred embodiment.

Figure 6:
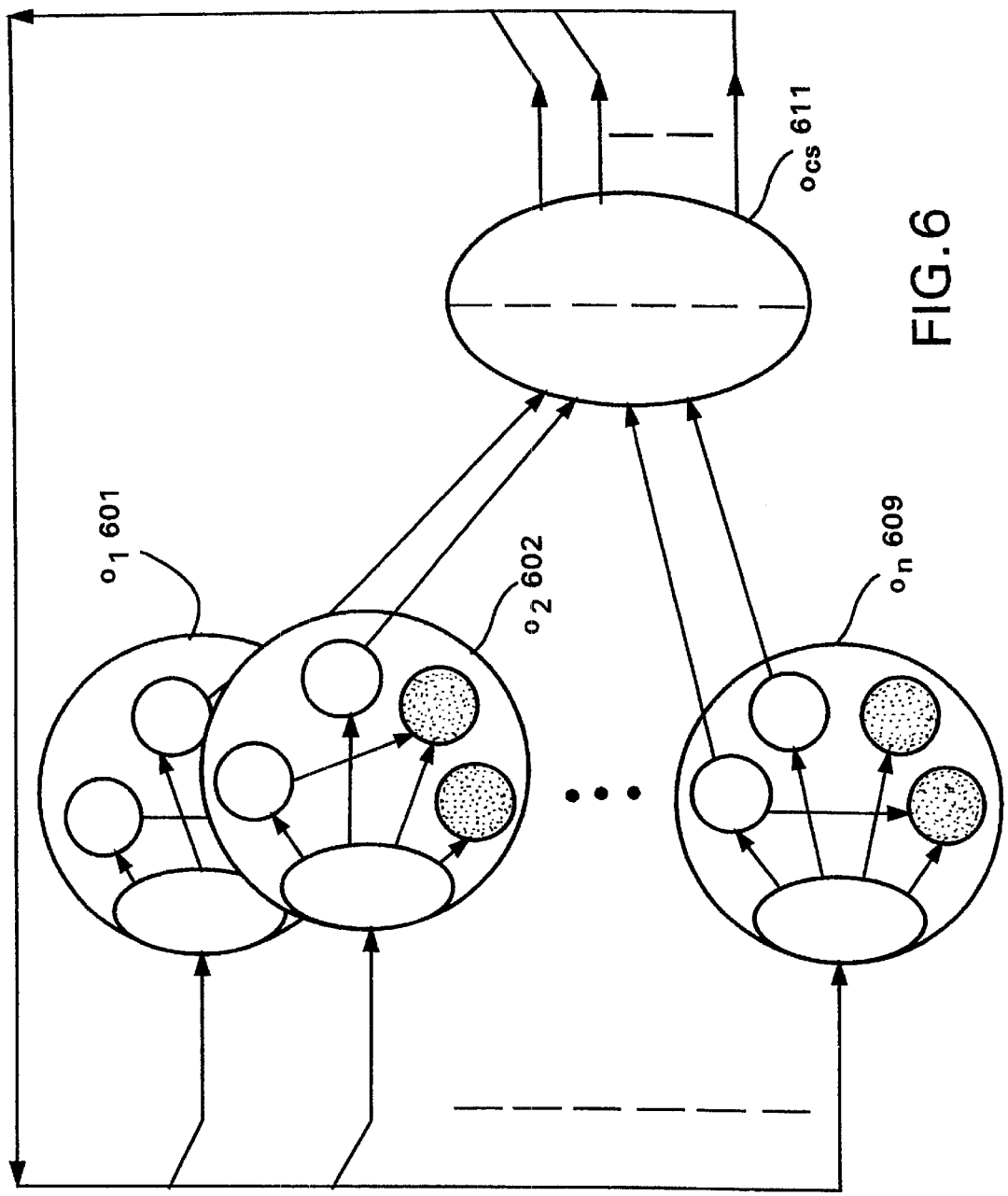
FIG. 6 depicts one technique for reducing coupling between objects by routing all communications between peer objects through a centralized switch object.

Such a centralized switch object can be implemented as a dispatch function or as a name table. As shown in FIG. 6, in such a software programming environment, objects $o_1$ 601, $o_2$ 602 ... $o_n$ 609 communicate amongst each other and with the external environment through the centralized switch object $o_{cs}$ 611.

Communication and Coordination Using an Agent

In a further embodiment of the present invention that also falls into the second class of problem solutions, the centralized switch object described above can be further enhanced by using an agent object $o_a$ 701, also referred to herein as an interface object, that provides the dispatch function and also acts as a controller, command mediator and coordinator of a set of related servers or resources $o_{s1}$ 711, $o_{s2}$ 712, ... $o_{sn}$ 719 as shown in FIG. 7.

The agent object technique is also an alternative approach to the preferred embodiment that uses output ports. However, as with the centralized switch object, it should be noted that it is possible to use the agent object concept in conjunction with the output port concept that is part of the preferred embodiment.

Figure 7:
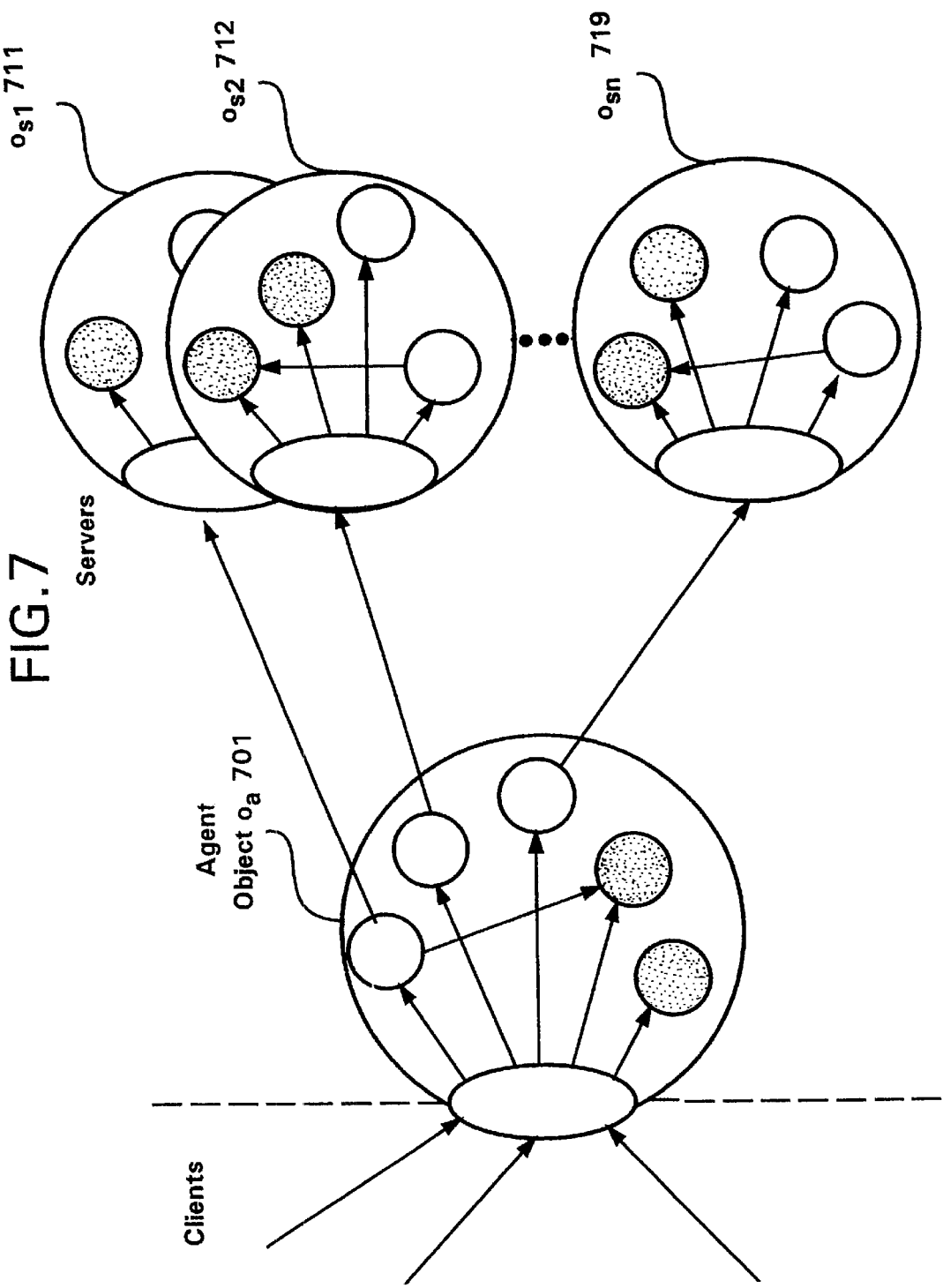
FIG. 7 depicts an exemplary embodiment of the present invention where an interface object coordinates communications between server objects.

The principal difference between the basic central switch object $o_{cs}$ 611 shown in FIG. 6 and the agent object $o_a$ 701 shown in FIG. 7 is that an agent object $o_a$ 701 can bring additional intelligence to the basic access functions that are implemented in the agent object and can thus be used to provide virtual views of each of the server objects 711–719. It should be noted that the functionality of the centralized switch object 611 and the agent object 701 are somewhat complementary to each other and can thus be combined in a further embodiment of the present invention.

Communication Using an Output Port

In the preferred embodiment of the present invention, the coupling between objects is reduced by introducing an enhanced object that possesses an output port in addition to the input port that is part of the traditional object-oriented paradigm. Such an output port (or output dispatch function) decouples the direct access to serving objects by functions or methods within the invoking object.

FIG. 8 shows an object $o_1$ 800 having both an input port $p_i$ 801 and an output port $p_o$ 802. The input port $p_i$ 801 serves as an attribute value or function name dispatcher while the output port $p_o$ 802 functions as an object-name dispatcher. When the object $o_1$ 800 shown in FIG. 8 receives a message, its input port $p_i$ 801 will either invoke one or both of the two functions $f_1$ 811 and $f_2$ 812 that are defined within the object, or it will directly access the three attribute values $v_1$ 821, $v_2$ 822 or $v_3$ 823 that are defined within the object. The functions $f_1$ 811 and $f_2$ 812 may also access or modify the attribute values $v_1$ 821, $v_2$ 822 or $V_3$ 823. However, neither of the functions $f_1$ 811 or $f_2$ 812 is permitted to invoke an external function or object directly. Functions $f_1$ 811 and $f_2$ 812 may access or communicate with external functions or objects only through the output port $p_o$ 802.

In order to implement this technique, in one embodiment of the present invention, every object referred to by another object is handled as a variable and is replaced by specific references to instantiated objects either at compile-time or at run-time by an instruction of the form:

object {receiver$_1$=object$_1$, . . ., receiver$_n$=object$_n$}

This expression symbolizes an object that is instantiated in an environment where the variable symbol "receivers$_1$" is to be interpreted as a reference to "object$_1$", etc. The references to instantiated objects may be bound at run-time rather than at compile-time if the implementation language supports dynamic binding. Further, the object name dispatch function may also be viewed and realized as a table.

Furthermore, if all references from an object to other serving objects are made indirectly using an "environment dictionary" or table (that can be implemented and treated as an attribute of the object) that is evaluated at run-time. The references can also be changed dynamically during the lifetime of the object in question.

It should be emphasized that the input and output ports in objects or higher-level components can be integrated during implementation into a unitary functional entity. Persons of ordinary skill in the art would appreciate that several techniques are available for implementing an input port, e.g., using a dispatch function along with a table. Although the present invention does not require that the implementations of the input and the output ports be identical, or even similar, considerations of design simplicity may be best served by using identical implementations for both input and output ports. Even greater programming efficiency can be obtained by combining the input and output port implementations into a single functional entity.

Figure 9:
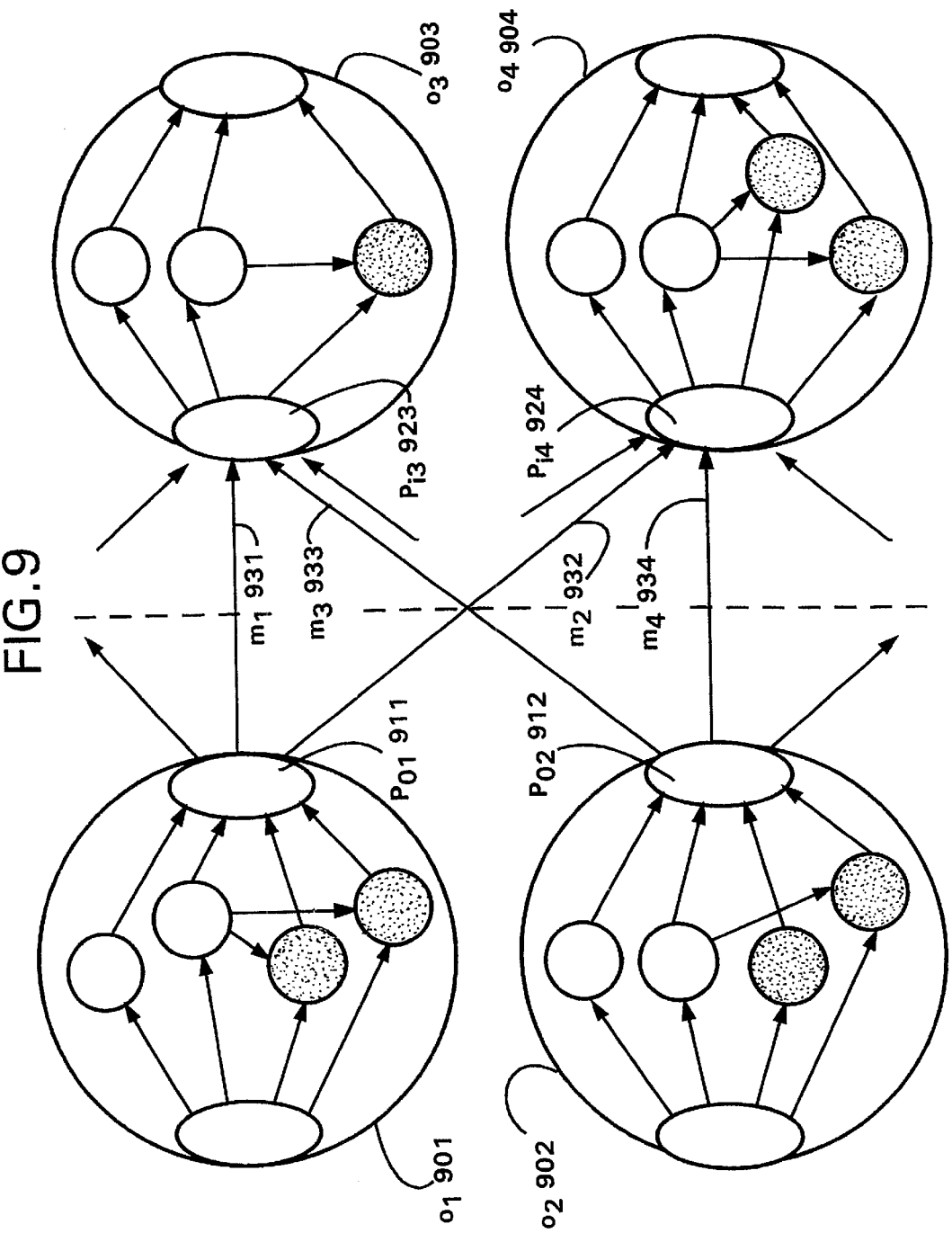
FIG. 9 is a higher level illustration showing the interaction and operation of the enhanced objects depicted in FIG. 8.

FIG. 9 shows an application of the output port concept shown in FIG. 8. In such a case, the output ports in a network of objects operate like a locally distributed dispatch function as shown in FIG. 9. The output ports $p_{o1}$ 911 and $p_{o2}$ 912 of objects $o_1$ 901 and $o_2$ 902 can thus invoke objects $o_3$ 903 and $o_4$ 904 by sending messages $m_1$ 931, $m_2$ 932, $m_3$ 933 and $m_4$ 934 to the input ports $p_{i3}$ 923 and $p_{i4}$ 924 of objects $o_3$ 903 and $o_4$ 904 respectively.

The replacement of symbolic references (or the binding of variables) by references to instantiated objects at compile-time or at run-time as discussed above aids in separating the task of creating a composition and coupling structure for each composed object (using lower level object instances) from the task of describing the content and behavior of each individual component's object class.

Such a separation is of great practical importance because it permits a truly modular architecture and system framework to be provided from which specific variants can be created later with very little additional effort.

It should be noted that the output port concept shown in FIG. 8 bears some similarities to the centralized approaches shown in FIGS. 6 and 7. However, the output port concept can provide additional programming flexibility in some circumstances. This can be best understood by considering an example. If two objects $o_1$ and $o_2$ both refer initially to an object $o_3$, under the centralized approaches shown in FIGS. 6 and 7, if object $o_3$ were to be replaced by an object $o_4$, then objects $o_3$ and $o_2$ would now both point to the same object $o_4$. In contrast, by using the output ports shown in FIG. 8, a software developer obtains additional programming flexibility because objects $o_1$ and $o_2$ can now point to different objects (say) $o_5$ or $o_6$.

This ability to change object links and pointers selectively is very useful in improving the modifiability of software programs.

Replacing Inheritance with Composition

Analyses of the object-oriented paradigm has traditionally focused on the hierarchies of object classes. It has been found in practice that excessively deep inheritance structures can make it difficult to modify an object-oriented software program. This is because inheritance relationships often create undesirably strong structural coupling. Furthermore, a composition structure is almost always needed, thus making it necessary to maintain a two-dimensional structure—an even more daunting task.

The class hierarchy creates a dimension or view that focuses on behavior and data similarities while the composition hierarchy creates a dimension or view that focuses on composition and coupling structures.

It has been found that changes in the class dimensionality often influences objects in their composition dimension. Thus, software systems become rigid and inflexible because changes in a generic object that is the root of a class hierarchy influences all of its ancestors and every system composition where it is used as a component, unless a particular change is overwritten by local design rules in some of the ancestors of the generic object.

It should be noted, however, that the existence of an effect does not automatically imply that there will always be operational problems. For example, the internal implementation details of functions can be changed as long as their meanings are preserved. Nonetheless, small changes in attribute representation may still influence the encoding of the external message and cause trouble at the system level unless the attribute values are isolated using specific access functions.

Figure 10:
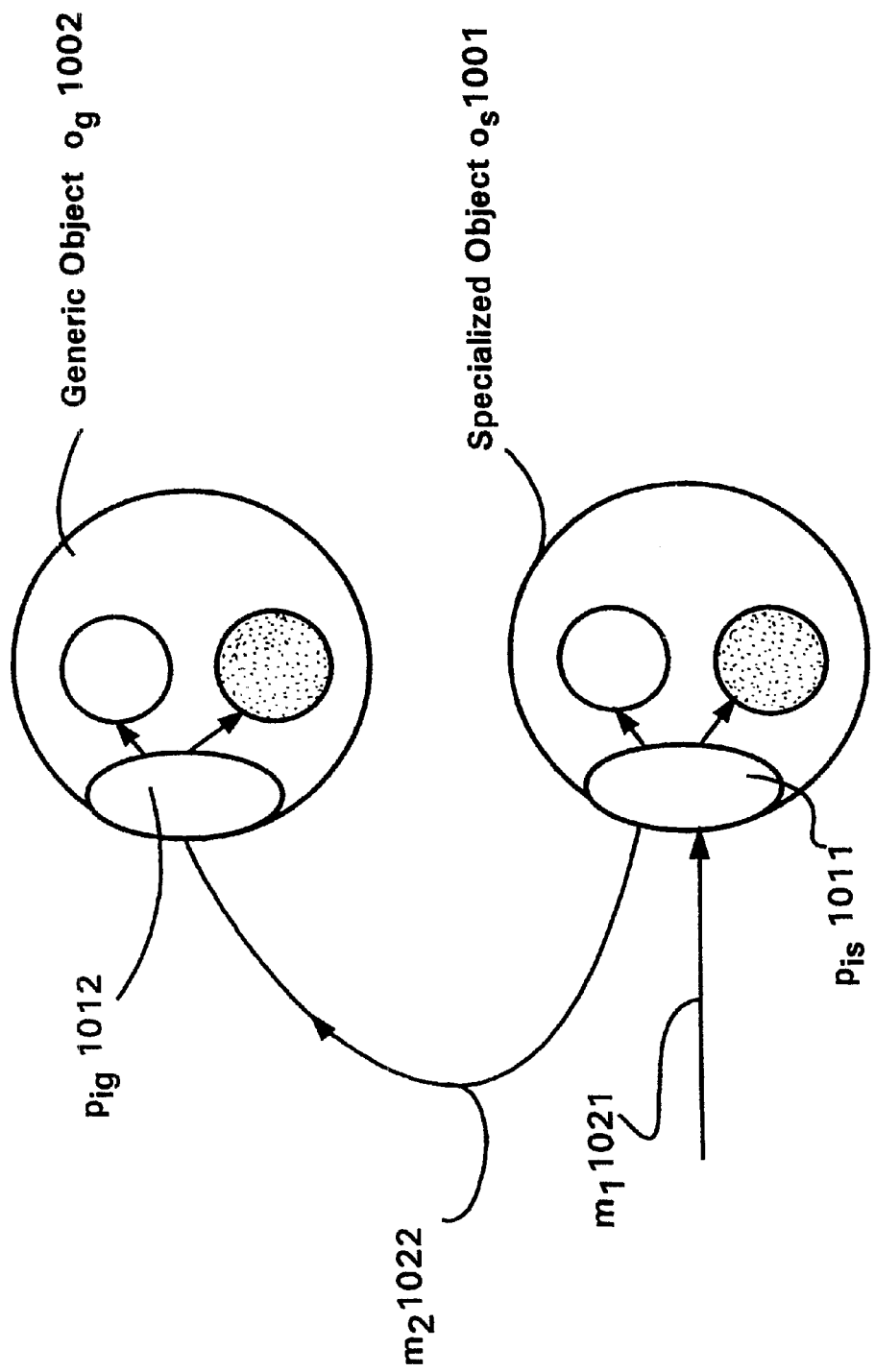
FIG. 10 shows a further embodiment to the present invention where a specialized object inherits its behavior from a generic object.
Figure 11:
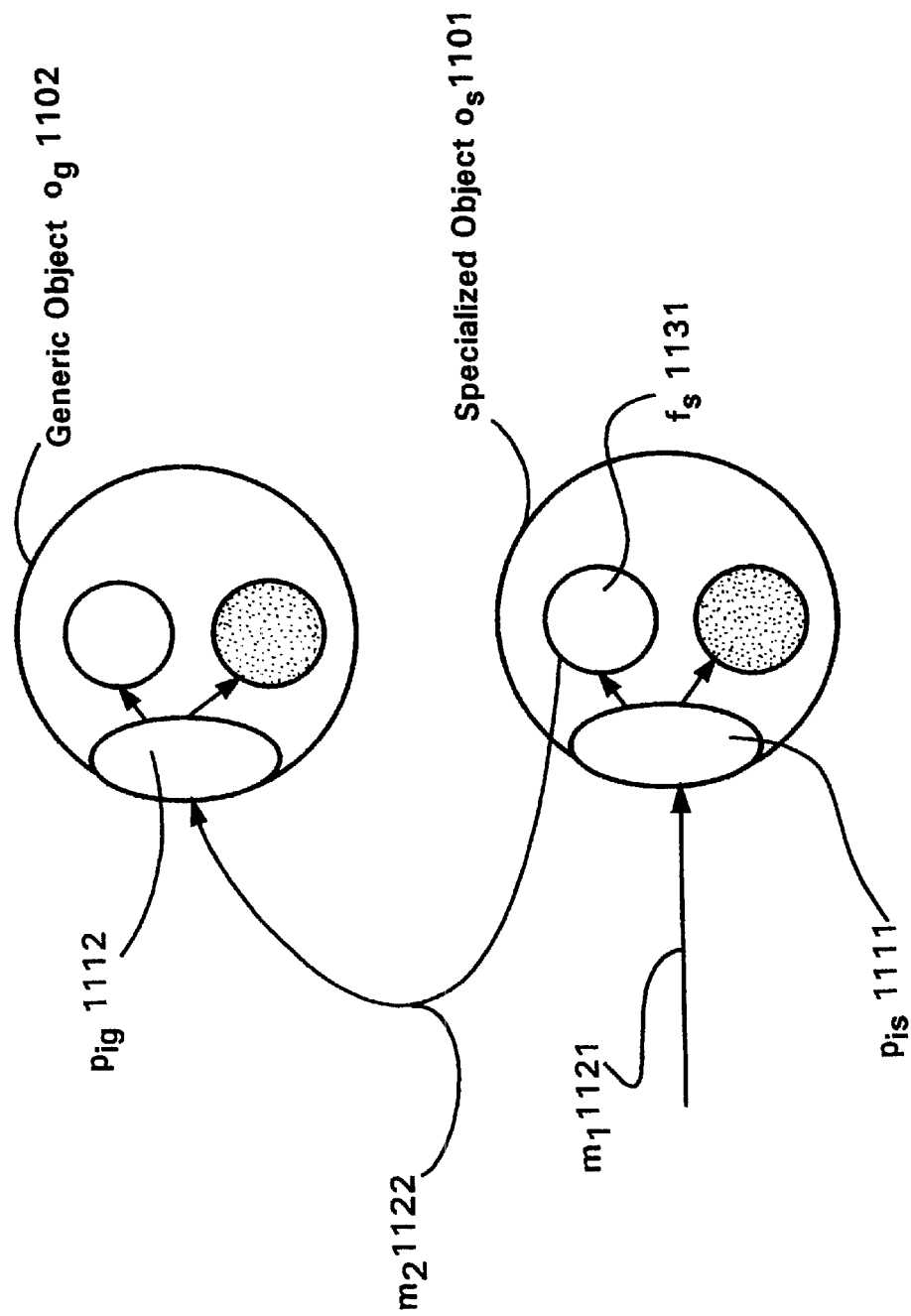
FIG. 11 depicts an additional embodiment of the present invention where the behavior of a specialized object is designed based upon cooperation with a generic object.

In a further embodiment of the present invention, many of the problems associated with maintaining either a class hierarchy or a composition hierarchy can be circumvented by replacing class hierarchies and their inheritance relationships as shown in FIG. 10 with composed objects that cooperate by communications as shown in FIG. 11.

FIG. 10 shows the inheritance relationship between a specialized object $o_s$ 1001 and a generic object $o_g$ 1002 in a traditional object-oriented programming environment. When the specialized object $o_s$ 1001 is invoked by a message $m_1$ 1021 received at its input port $p_{is}$ 1011, it sends a message $m_2$ 1022 to the input port $p_{ig}$ 1012 of the generic object $o_g$ 1002.

In contrast, in the cooperative model of object interaction illustrated in FIG. 11, when a specialized object $o_s$ 1101 receives a message $m_1$ 1121 at its input port $p_{is}$ 1111, it invokes an internal function (or method) $f_s$ 1131 in object $o_s$ 1101. The function $f_s$ 1131, in turn, sends a message $m_2$ 1122 to the input port $p_{ig}$ 1112 of the generic object $o_g$ 1102. Thus, in the cooperative model of object interaction, each specialized object can be viewed as an agent that uses generic objects as resources as needed. It should be noted that multiple specialized objects can all refer to the same generic object.

Figure 12:
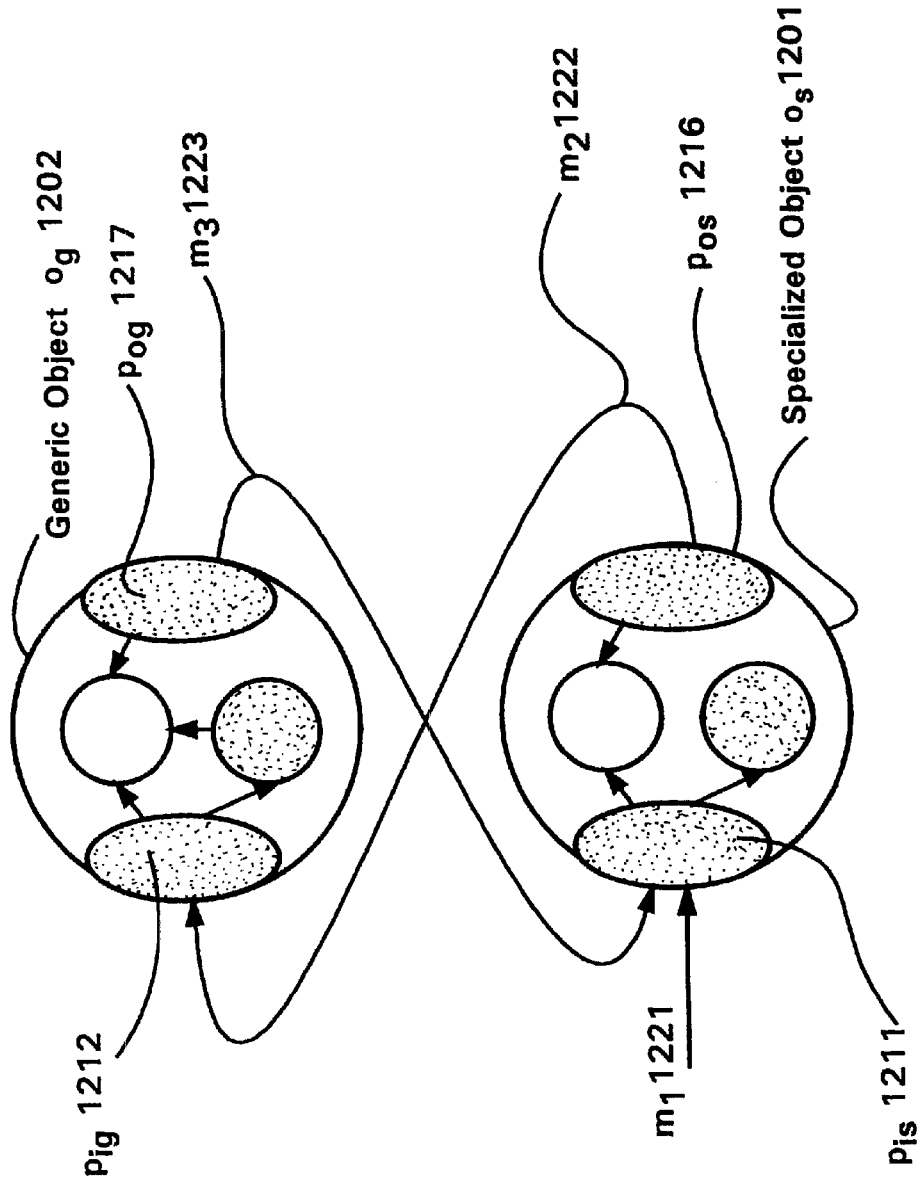
FIG. 12 depicts an additional embodiment of the present invention where the behavior of a specialized object having an output port is designed based upon cooperation with a generic object having an output port.

The cooperative model of object-interaction can be conjoined with the output port concept of FIG. 8 as shown in FIG. 12 although the two concepts—of cooperation and of output ports—are not interdependent. The cooperative model of object interaction can also be used in conjunction with the centralized switch object of FIG. 6 or the agent object of FIG. 7.

One of the advantages of using a composition structure is that it can be changed dynamically at compile-time or even at run-time—unlike a class hierarchy which needs to be finalized during the design stage of a software system.

In addition to this significant benefit, another advantage of using a composition structure is that it permits generic components to be used in more situations (by combining them) than an inheritance-based structure. Furthermore, the use of composition structure also eliminates the need for multiple levels of inheritance—the traditional technique for enhancing programming flexibility in the current object-oriented programming paradigm.

Implementation of Composed Objects

At any composition level, components of the software system may have specialized or distinguished roles such as controllers (also known as control objects), resources (also called entity objects) and interfaces (also known as interface objects). Such a structure can be discerned in many software systems and has also been proposed as part of an analysis method where the underlying analysis model has been partitioned into control objects, entity objects and interface objects, see, e.g., I. Jacobson, M. Christerson, P. Jonsson & G. Övergard, Object-Oriented Software Engineering: A Use Case Driven Approach 132 (ISBN 0-201-54435-0, Addison-Wesley 1992).

If we compare this to the agent concept described earlier in conjunction with the discussion of FIG. 7, the present method divides the role of an agent into two parts: an interface element and a control element. It has been found that such a functional separation will be effective only if the influence of any changes in program structure falls largely upon the control element alone while the interface element is influenced only occasionally and resource (or other data-intensive) elements are influenced rarely, if at all.

Figure 13:
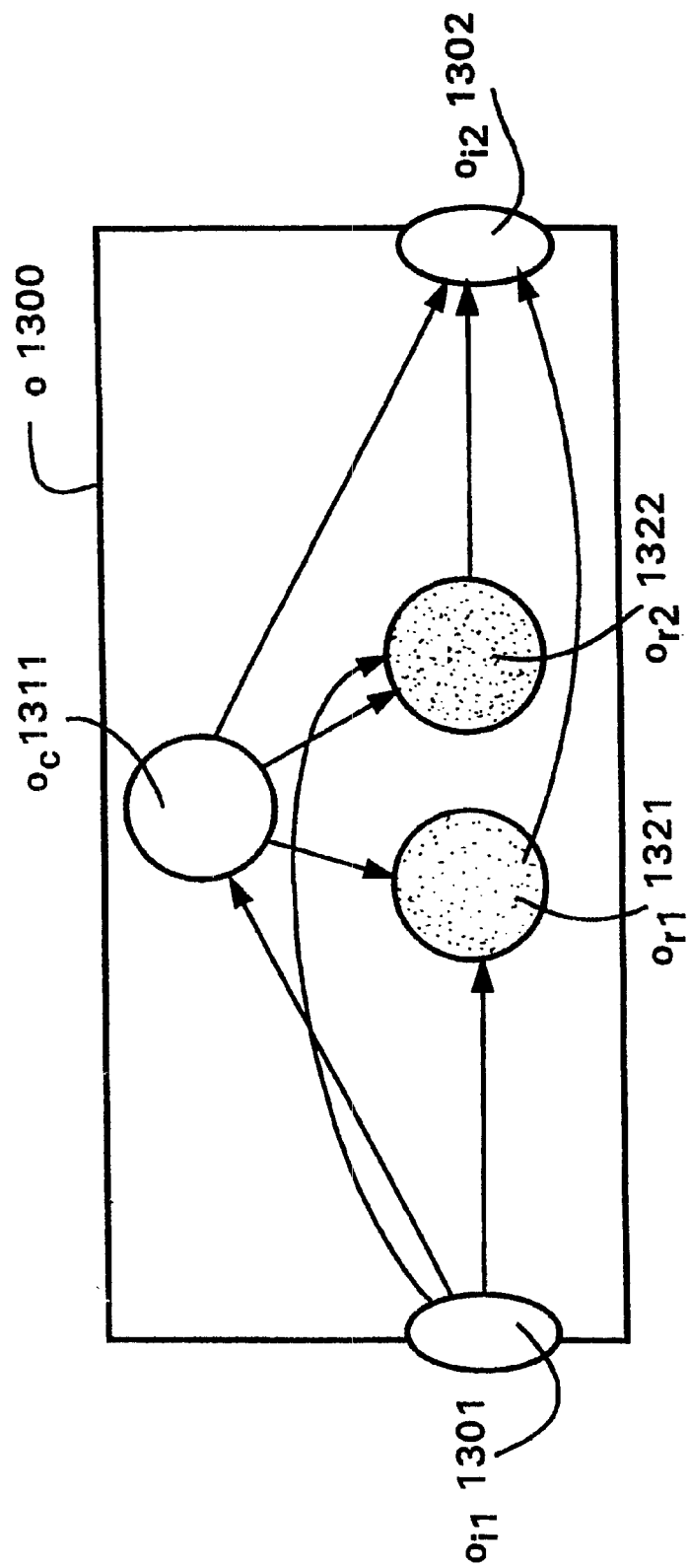
FIG. 13 shows an exemplary implementation of a component as a composed object where interface objects pass information to various control and resource objects.
Figure 14:
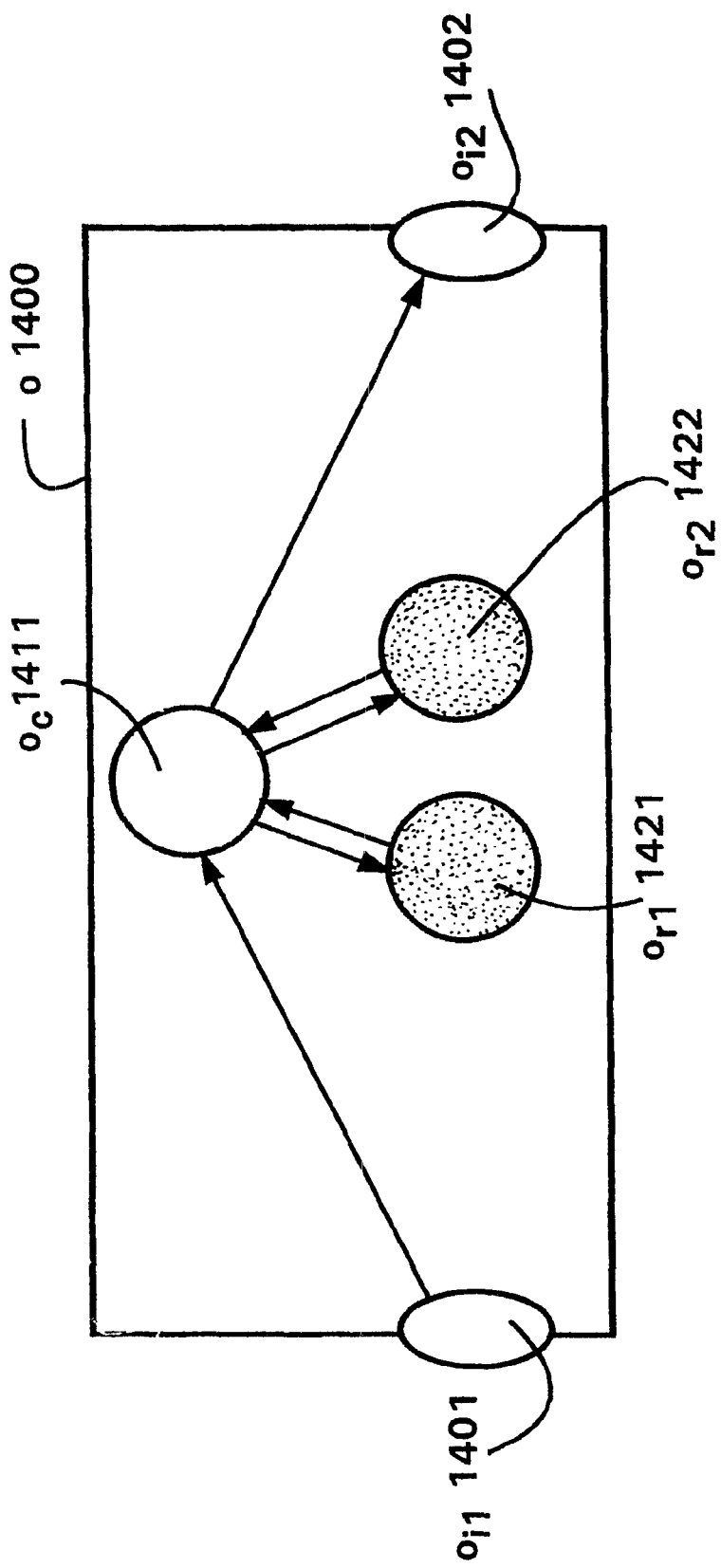
FIG. 14 shows an exemplary implementation of a component as a composed object where all information processed through a unitary control object in the component.
Figure 15:
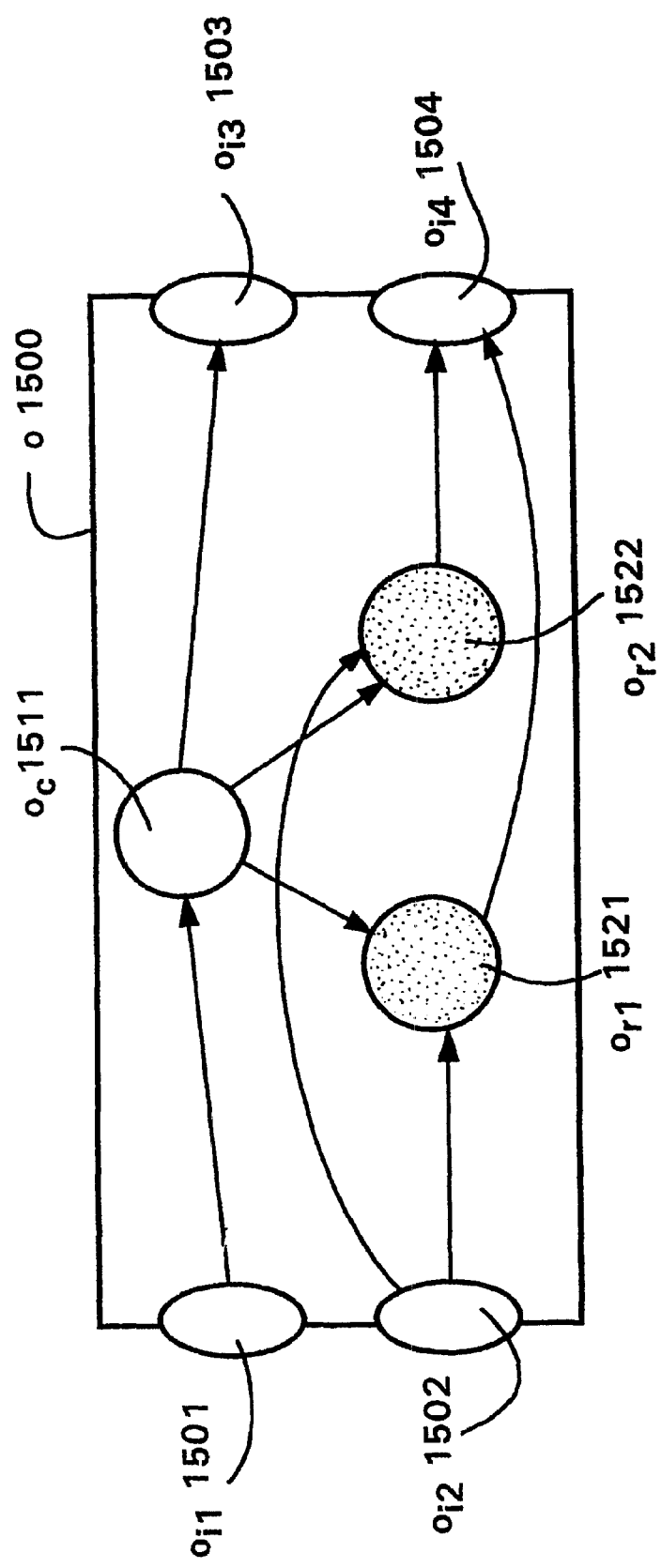
FIG. 15 shows an exemplary implementation of a component as a composed object where separate interface objects or ports are used for dealing with the flow of control information and for data.

There are several ways of implementing a component as a composition of different types of objects or of simpler (or lower-level) components. Three such exemplary techniques are shown in FIGS. 13–15. In the following discussion of the component implementation techniques shown in FIGS. 13–15, it should be emphasized that components constitute a higher-level description of a software system than the primitive objects discussed earlier. Just like primitive objects, components too can have input and output ports. As can be expected, the input and output ports of a component are higher-level abstractions of the input and output ports of a primitive-level object. Thus the control objects $o_c$ 1311, $o_c$ 1411 and $o_c$ 1511 shown in FIGS. 13–15 can also have behavior associated with it and is not restricted to only switching functions as might be expected of a primitive object. The components in a software system play various roles and constitute the building blocks of a software system from a higher-level perspective. FIGS. 13–15 depict three exemplary and alternative approaches to the design and development of the architecture of a software system. These approaches which are alternatives to the output port concept of FIG. 8, are not limited to the object-orientation paradigm, as roles can be assigned to the various components at both high— as well as low-levels.

FIG. 13 shows a component implemented as a composed object o 1300 where interface objects $o_{i1}$ 1301 and $o_{i2}$ 1302 pass information to and from a control object $o_c$ 1311 and resource objects $o_{r1}$ 1321 and $o_{r2}$ 1322. In such an implementation, resources, servers and interface objects can be directed to send all information directly to other controlled objects via an object o 1300 that creates the overall function as shown in FIG. 13.

FIG. 14 illustrates another implementation of a component as a composed object o 1400 where all information passes through a centralized control object $o_c$ 1411. In such an implementation, information is permitted to pass to or from the interface objects $o_{i1}$ 1401 and $o_{i2}$ 1402 to the resource objects $o_{r1}$ 1421 or $o_{r2}$ 1422 only through the control object $o_c$ 1411.

A third technique for implementing a component as a composed multi-ported object o 1500 is depicted in FIG. 15 In such an implementation of a component, the component may comprise multiple input and output ports with separate interface objects (or ports) for dealing with the flow of control information and data. Thus, the interface object $o_{i1}$ 1501 is used for all incoming invocations to the component's control object $o_c$ 1511 while the interface object $o_{i3}$ 1503 is used for all invocations of external objects by the control object $o_c$ 1511.

Similarly, the interface object $o_{i2}$ 1502 is used by external objects and components to access the resource objects $o_{r1}$ 1521 and $o_{r2}$ 1522 and results are directed to their eventual destination through the interface object $o_{i4}$ 1504. Those skilled in the art will appreciate that it is also possible to implement a component by combining control and interface objects into an unitary object having a role similar to the agent object discussed earlier in conjunction with FIG. 7.

System Modifiability

Software systems often need to be modified. For example, a generic object maybe customized in several different ways for multiple software application programs, each of which uses modified versions of the generic object. We will next examine the modifiability of a software program at the system level (i.e., at the level of software modules) rather than at the component level or at the object level.

As can be seen from the discussion that follows, the modifiability of computer software can be significantly enhanced if software modules had input and output ports. As used herein, a software module can be defined as a composition of one or more objects. Each software module can have more than one input and output port. This is in contrast to an object that is ipso facto permitted to have only one input port and one output port. The use of input and output ports for objects enhances the modifiability of computer software by both making the modification process systematic and by isolating and localizing the effect of changes to software.

It should be noted that the modifiability analysis that follows does not concern the modifiability of the internal elements or structure of an object such as attributes and functions which can be modified by creating new component or object classes. There are at least four principal techniques for system modification: specialization, adaptation, extension and replacement. Each of these four techniques which fall into the first class of solutions to the coupling problem in the object orientation paradigm is considered in greater detail further below.

Specialization

Figure 16:
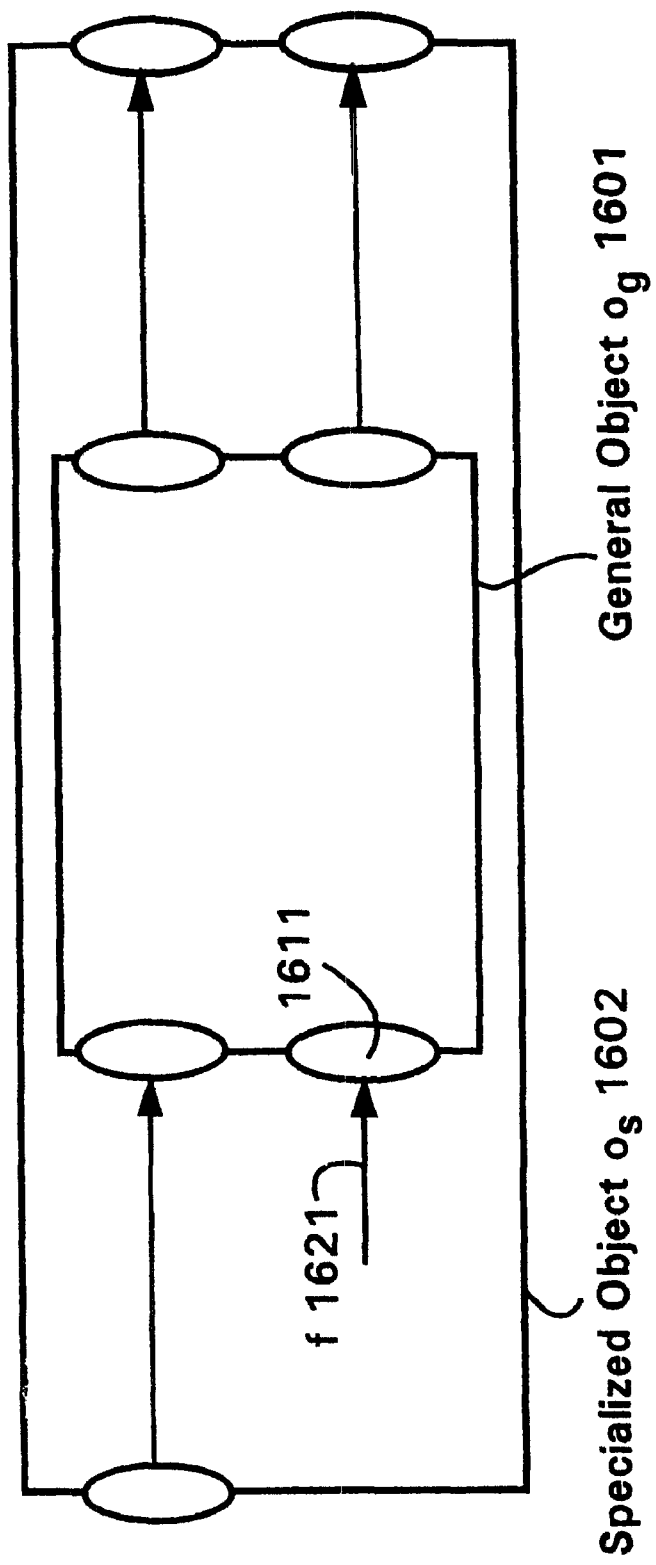
FIG. 16 illustrates the input specialization technique for modifying a software system.
Figure 17:
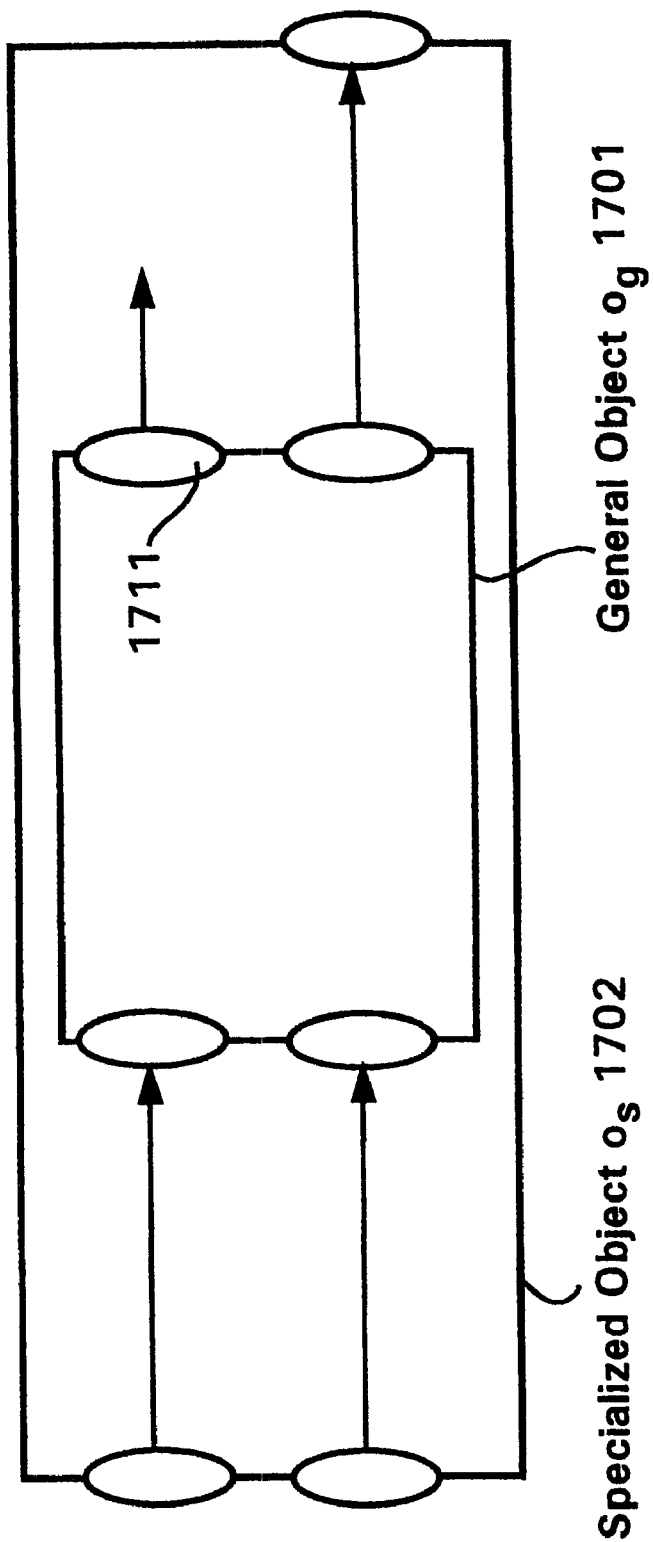
FIG. 17 illustrates the output specialization technique for modifying a software system.

A general object $o_g$ 1601 can be modified into a specialized object $o_s$ 1602 by restricting input and/or output ports messages or attribute value domains. This technique which has hitherto been used principally with optimizing compilers is illustrated in FIG. 16 where one of the input ports 1611 of the general object $o_g$ 1601 is bound to a specific function f 1621 to create the specialized object $o_s$ 1602. Just like the input specialization depicted in FIG. 16, one can also have output specialization as shown in FIG. 17, where one of the output ports 1711 of the general object $o_g$ 1701 is left unused to create the specialized object $o_s$ 1702.

Specialization of components and objects can be implemented by setting parameters during the design stage. It would be appreciated by those skilled in the art that for output specialization to be useful, it is necessary to first create multi-purpose objects and then selectively activate their functionality at compile-time or run-time. By using a partial evaluation technique that is built into the compiler, the components and objects can thus be optimized for each particular setting.

Adaptation

Another technique for system modification is adaptation, which is defined herein as the mapping of one or more input or output values to or from a generalized object $o_g$ to create a specialized object $o_s$. The adaptation technique has hitherto been used only with parametrized software wherein software elements are designed as general purpose components that can handle a variety of inputs. Building in additional functionality than that minimally required to perform the task at hand permits the software elements to be modified with relative ease to handle different tasks than the ones initially contemplated. This technique bears some similarities to the use of filters with data streams. Like specialization, this modification technique also has two flavors: input adaptation and output adaptation.

Figure 18:
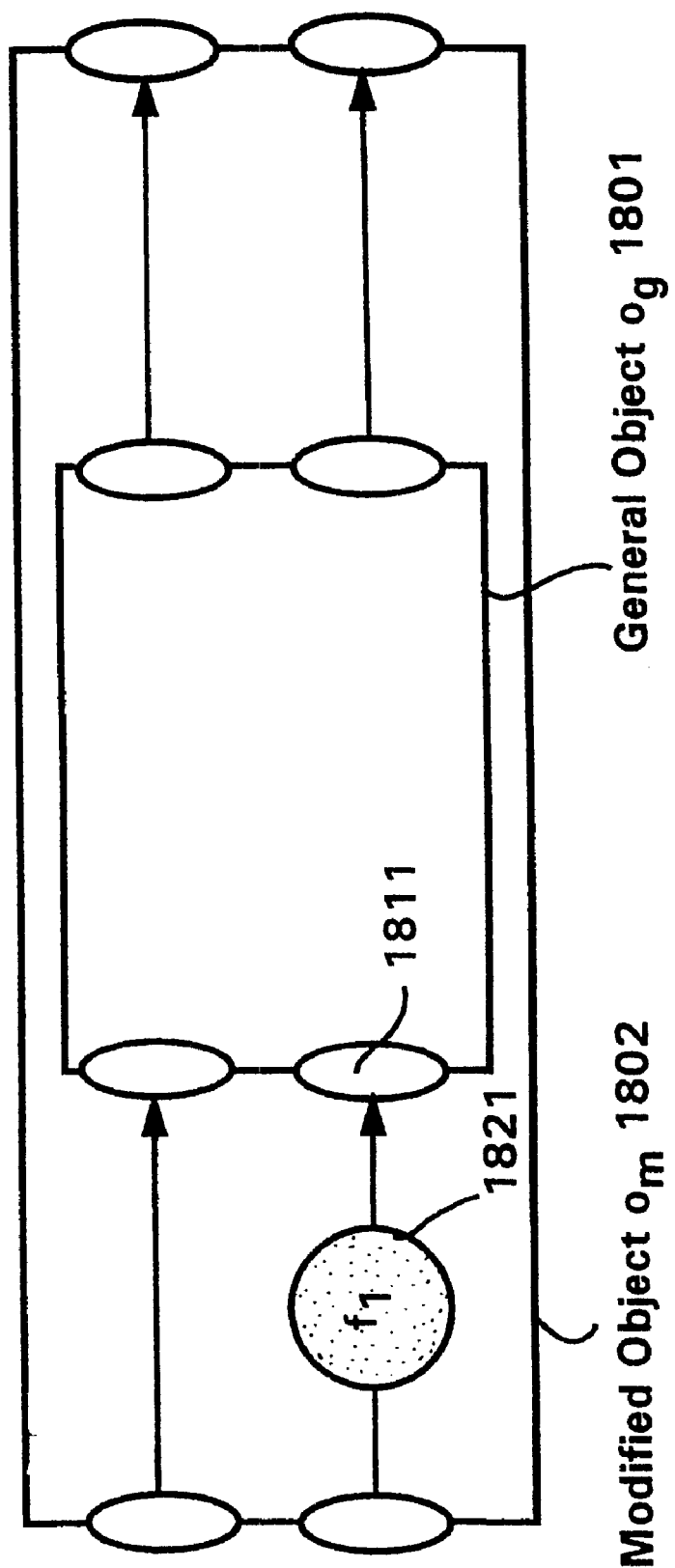
FIG. 18 illustrates the input adaptation technique for modifying a software system.
Figure 19:
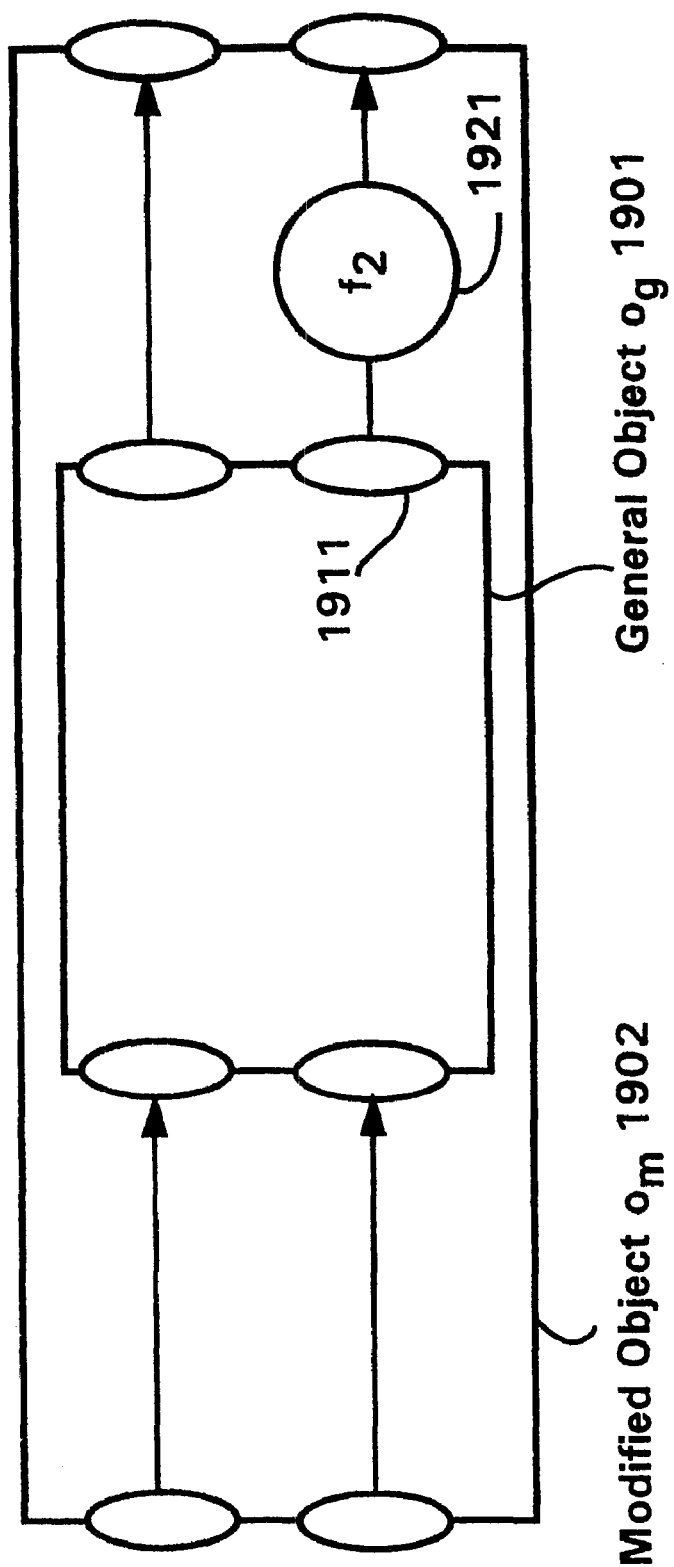
FIG. 19 illustrates the output adaptation technique for modifying a software system.

FIG. 18 illustrates input adaptation modification technique where one of the inputs 1811 to a general object $o_g$ 1801 is modified by a transformation function $f_1$ 1821 to create a modified object $o_m$ 1802. Output adaptation is depicted in FIG. 19 where one of the outputs 1911 of the generalized object $o_g$ 1901 is modified by adaptation via a function $f_2$ 1921 to create the modified object $o_m$ 1902. As with the specialization technique shown in FIGS. 16 and 17, partial evaluation or program manipulation techniques can be used here too to optimize the implementation of the modified objects.

Extension

The third technique for system modification is to extend the functionality of a general object $o_g$ 2002 or 2102 by coupling it to a new object called an extension object $o_e$ 2003 or 2103. The extension technique for system modification, like the specialization and adaptation techniques described in FIGS. 16–19, also has two flavors: parallel extension and coupled extension.

Figure 20:
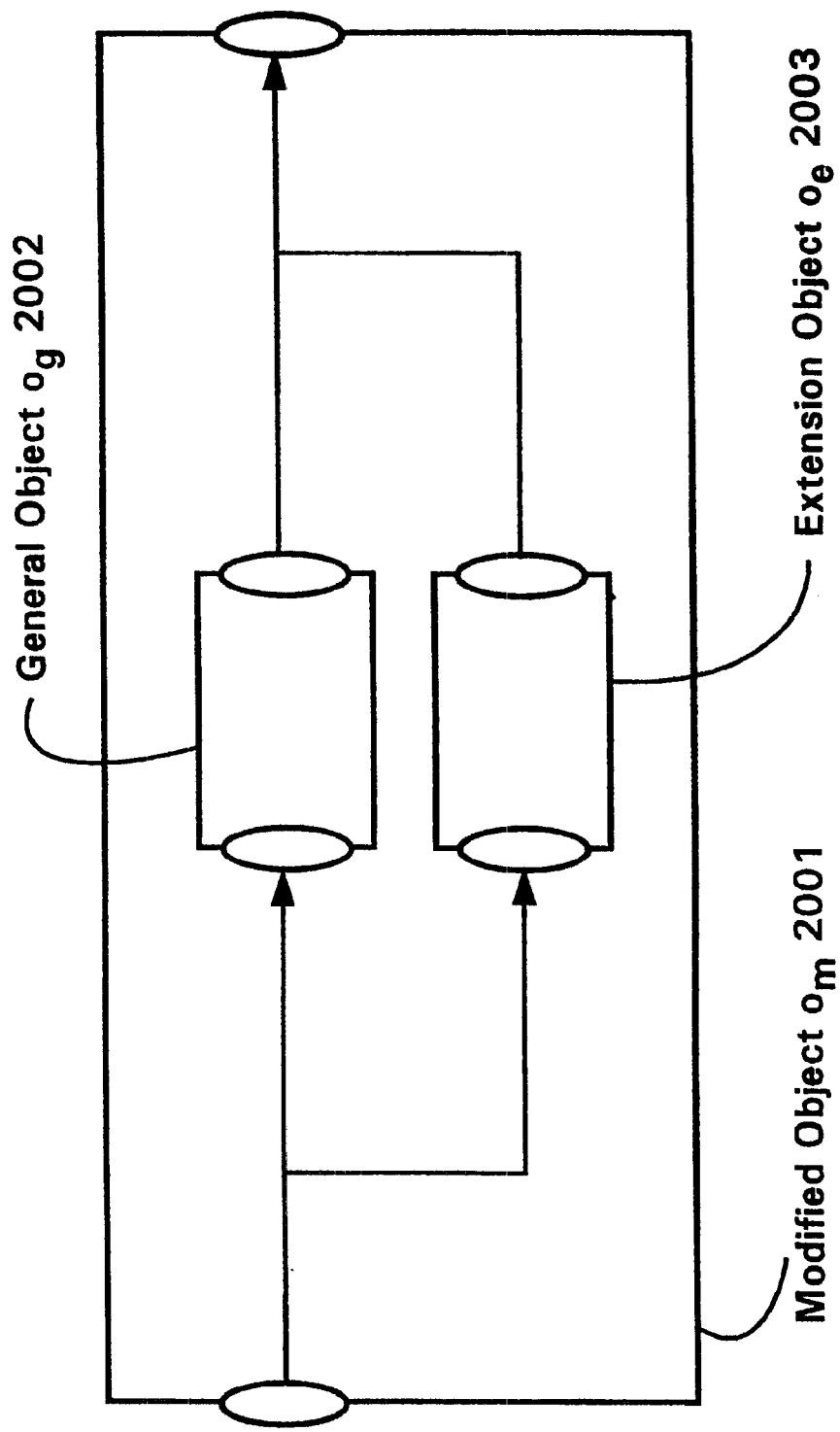
FIG. 20 illustrates the parallel extension technique for modification of a software system.
Figure 21:
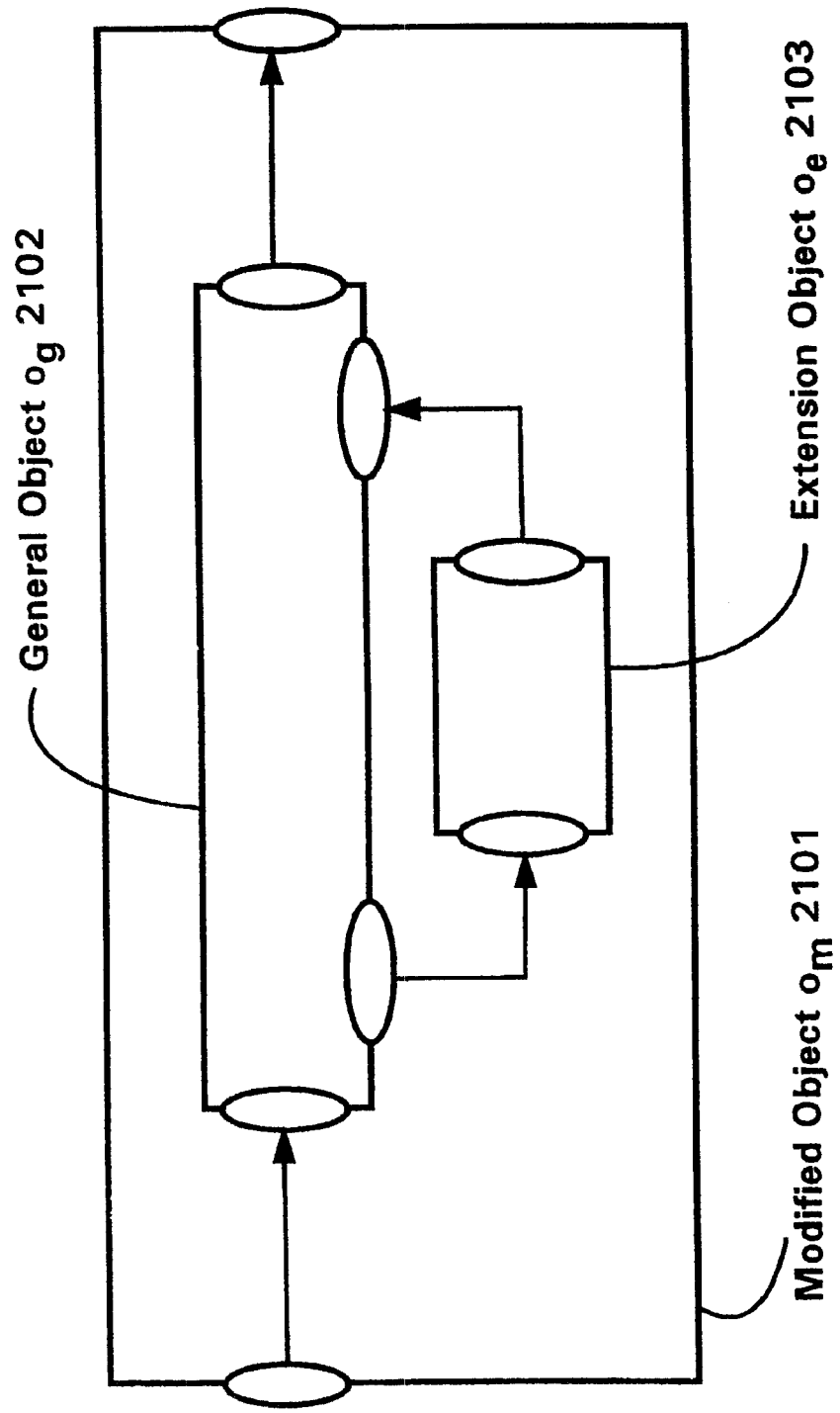
FIG. 21 illustrates the coupled extension technique for modification of a software system.

Parallel extension is illustrated in FIG. 20, where the modified object $o_m$ 2001 is created as a combination of an exemplary extension object $o_e$ 2003 operating in parallel to the preexisting general object $o_g$ 2002. FIG. 21 depicts the coupled extension technique where an exemplary extension object $o_e$ 2103 is coupled as an attachment to the existing general object $o_g$ 2102 to create the modified object $o_m$ 2101.

The extension technique of system modification is very useful whenever one needs to extend a generic element that is common to multiple product lines by combining them with specificelements that are particular to one or more individual product lines.

Replacement

Figure 22:
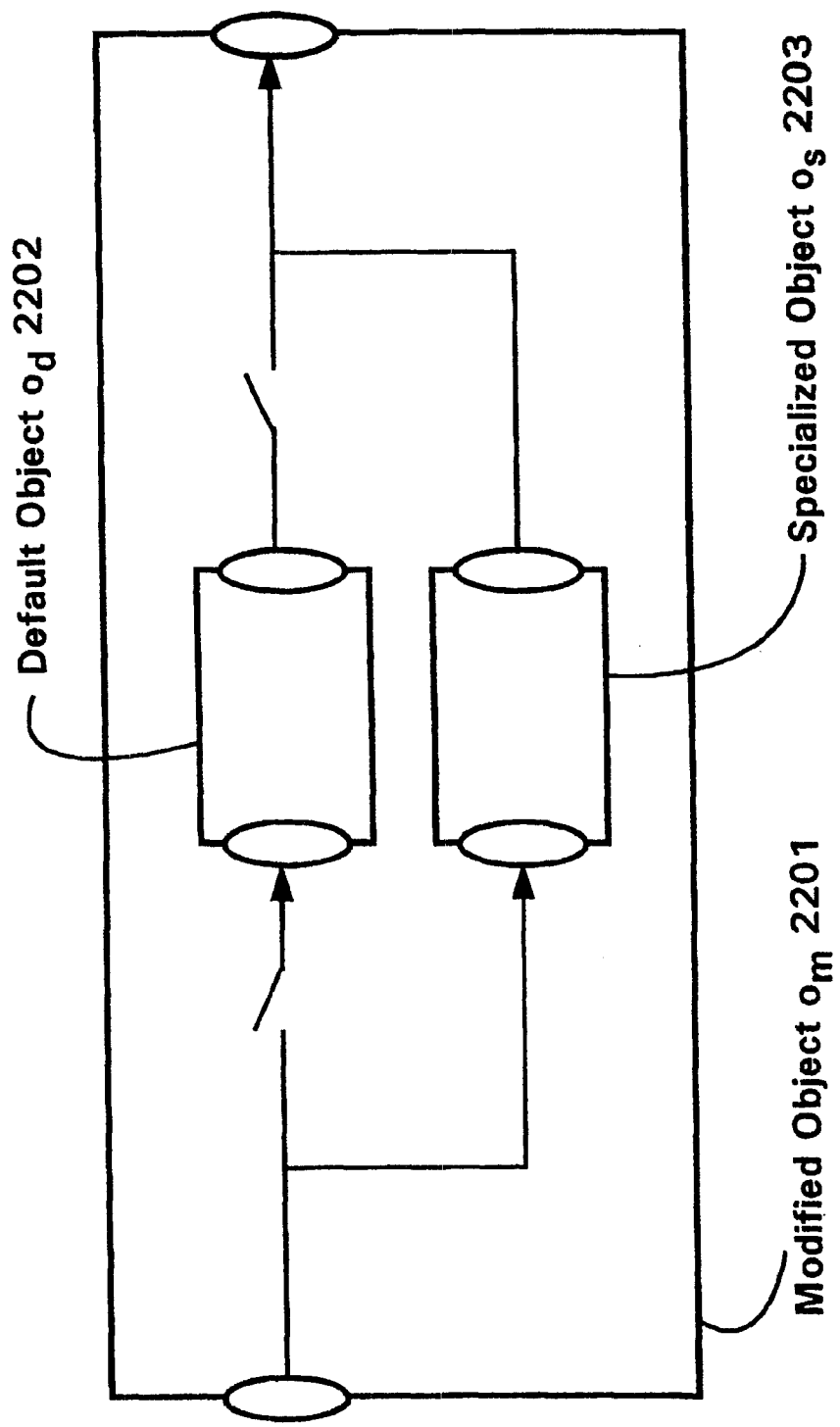
FIG. 22 illustrates the replacement technique for modification of a software system.

The fourth technique for system modification is replacement. The replacement technique of system modification is most useful when a default object $o_d$ 2202 is replaced with a specialized object $o_s$ 2203 that uses either the same (or a slightly extended) interface as the default object to create the modified object $o_m$ 2201. This technique is shown in FIG. 22.

General Architectural Principles

It has been found that most successful software architectures have been built to support clear design concepts that were established prior to the definition of the architecture. The design concepts are driven by the system requirements. For example, if a software system needs to cover a large application domain containing a set of static but specialized a applications, then the design concept can be a generalized base system that can be adapted either by extensions to, or by specialization of, such a base. On the other hand, if the identification of a static and specialized application is not feasible, then the design concept can be a dynamically adaptive system that covers the entire domain, without extensions or specializations.

The inter-relationships between system requirements, the design concept and the software architecture makes it important to analyze, capture, formalize and validate the system requirements properly. In order to create a good software architecture, it is helpful to additionally have a good understanding of such inter-relationships, different design concepts and design trade-offs.

Other, more technically-oriented, tools that support the development of good software architectures include decomposition tools. Such tools can provide both analytic information about a system being decomposed, as well as synthesize the decomposition more directly.

Decomposition tools aim to identify and separate groups of strongly coupled elements in a software system from those elements that are weakly coupled, or are not coupled at all. The resulting partitioning is a set of subsets, where each subset is characterized by a selectable degree of coupling. This coupling (which may be of different kinds) can be quantified, for example, by counting the total number of exchanged messages (between either object instances or object types) or by counting the total number of common communication channels, etc.

This technique can be extended by basing such decompositions not just on communication-based coupling relationships but also on other types of relationships or attributes that are shared by the elements being studied. It should be emphasized that sound architectural decisions will result only if each structure and important relationship of the architecture is analyzed in a similar fashion.

Frequently, the principal characteristic that distinguishes a good software architecture from a poor one is the adaptability of the architecture to changes in the application environment. An architecture specialized for a static environment will remain useful only for as long as the environment remains stable.

However, since neither the system designers nor the users can foresee the future, we cannot predict how long an environment will remain stable. Further, preparing for every possible future environmental scenario is prohibitively expensive. Consequently, one needs a different approach towards designing a new software architecture.

The first task in the preferred approach is to identify and analyze the needs of every important user and product planned for the foreseeable future. The result of this analysis defines the application domain and helps identify common denominators. These common denominators can be used to define good generalizations and prepare specialization options, that can create an architecture that can cover the entire application domain.

The next task is to plan for the unforeseeable future. It has been found that an object-oriented software design can be prepared for the unknown future if the following design principles are followed:

The design is simple and thereby easy to change.

The design is equipped with well-defined boundaries and interfaces, as well as a normal decomposition structure.

The design keeps all changes and the effects of changes localized.

As far as possible, the structure is maintained without change, while any remaining need for change are encapsulated in small software units that are relatively easy to change and verify.

If, in order to modify a system's behavior, its structure needs to be rearranged by replacing or modifying many elements at several different levels, then the architecture is unlikely to be commercially successful. However, if then need for change is limited to a few elements or confined to one level, then the chances for commercial success are much greater. It has been found that a few key concepts recur in large application domains and consequently, it should be relatively easy to adapt well-generalized and specialized hierarchies in the application domain to unforeseeable environmental changes.

Further, in order to be flexible, and thus prepared for change, a good architecture must be characterized by a basic design that is easily adapted to a large domain of applications. Such a general base should constitute the largest possible common denominator for all foreseen applications. Further, a good architecture must be amenable to easy modification or extension of the application domains.

The first requirement can be supported by object-oriented implementation techniques, i.e., especially if viewed as an aid for generalization and specialization of objects. However, at present, it is not clear whether traditional object-oriented programming techniques can adequately support the second requirement. In one embodiment of the present invention, encapsulated objects that communicate with each other through well-defined message-based interfaces support the second requirement, by making it easier to replace one object with a modified object.

However, the isolation of an object from its environment is only unidirectional, from the outside in. Thus in contrast to component-orientation, object-orientation does not provide isolation in the reverse direction, that is, from the inside out.

Both object-orientation and component-orientation can contribute to a system structure that is also quite stable, partly because such a structure is frequently based on phenomena and communication schemes that have physical or natural relationships. Needless to say, the best architecture is that which results from a thorough study and careful analysis of applications, the problem domain, the requirements of users, clarity about the aim of the design and knowledge of other good designs.

In the preferred embodiment of the present invention, input and output ports are proposed as the major means of decoupling the communication between objects. Separate input and output ports are needed because their roles are designed to be different. An input port maps a function name to a function implementation and mechanically applies the function to the arguments received in conjunction with the invocation of the function name. In contrast, an output port maps symbolic object references to instantiated objects.

In several real-time applications it has been desired to be able to replace an object with a modified object in a running ("hot") system. Changes of this kind can be provided if dynamic linking tables (also known as coupling tables) are used to implement the input and output ports, as detailed in conjunction with the discussion of FIG. 8.

In summary, the following rules need to be adhered to in order to ensure that the architecture is good:

The attributes (i.e. the data) that are necessary for communicating with an object must be identified in advance since these attributes contain information about an object's control state.

The basic meaning (i.e. the semantics) as well as the encoding (i.e. the syntax) of each message must be well-defined and kept stable. As a corollary requirement, if the syntax or the semantics of a message changes, then each object that receives that message also need to be changed.

The potential payoff from a generalization effort must be determined in advance.

Deep type hierarchies and their associated inheritance techniques should be avoided and replaced instead with compositions of and cooperation between object groups.

Frequently changing elements should be isolated from elements that are stable over long periods of time and that are present in many similar applications.

Decoupling techniques that keep objects from directly referring to one another should be used.

A Critical Analysis of TMN, a Proposed Standard for Interoperability

Architectures are often influenced by standards. Presently, there are several efforts to standardize the interoperability of application programs. In order to permit the interoperability of nodes in a telecommunications network and Operation Support System (OSS) applications, the International Telecommunications Union (ITU) (formerly known as the CCITT) has defined a standard, called Telecommunications Management Network (TMN), that relates to the management of telecommunication networks. See CCITT Draft Recommendation No. M.3010, Principles for a Telecommunication Management Network.

This draft ITU standard strongly emphasizes the use of standardized interface languages and decoupling by using abstract views of managed objects, and thus represents a solution to the decoupling problem in software systems at a higher (system architecture) level than the present invention.

Figure 23:
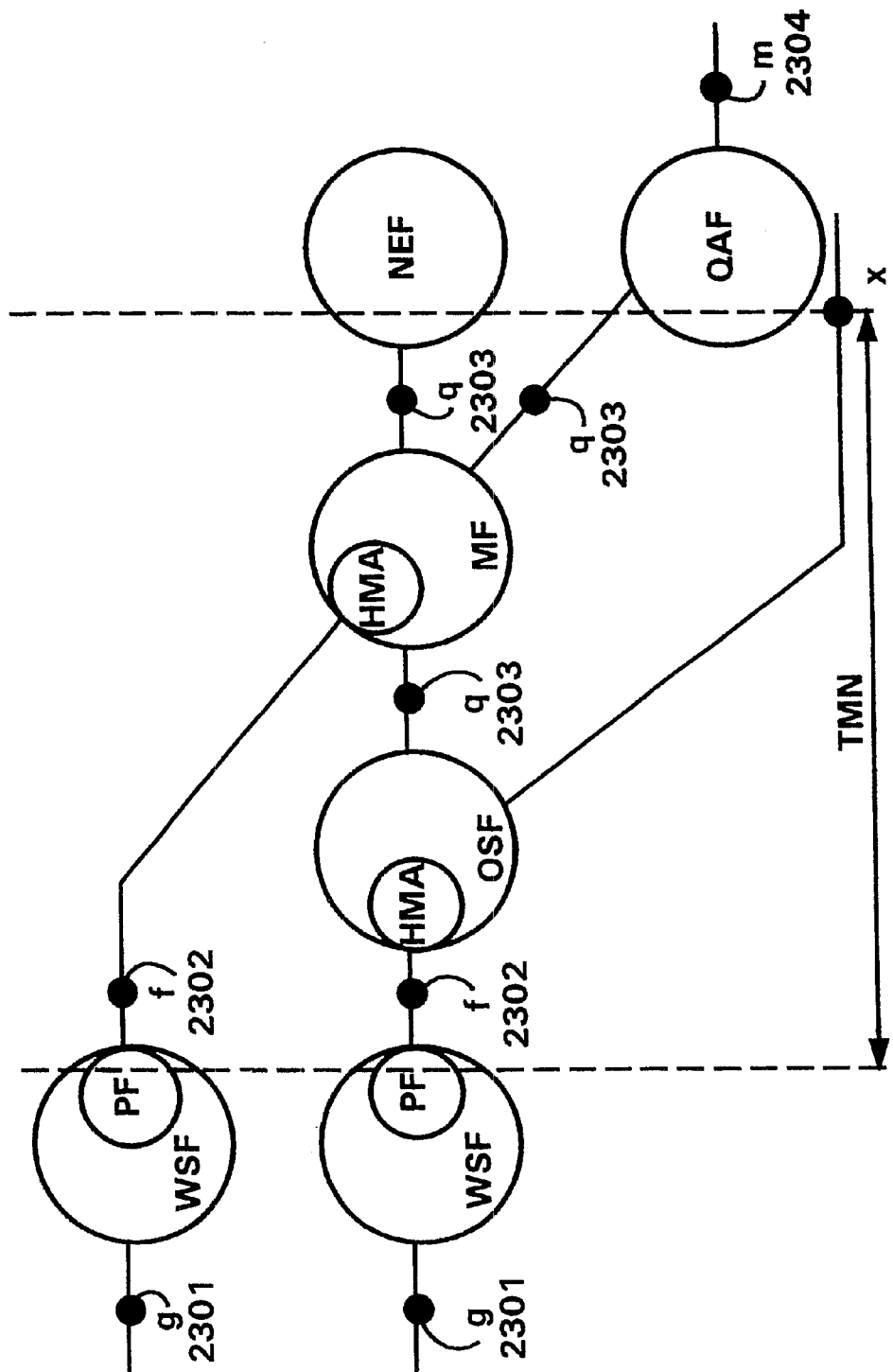
FIG. 23 shows the functional architecture of the Telecommunications Management Network (TMN) standard as set forth in ITU Draft Recommendation M.3010.

The functional architecture of TMN is shown in FIG. 23 and partially embodies some of the architectural principles summarized earlier in this patent application. In FIG. 23, the acronyms WSF and PF stand for "Work Station Function and Presentation Function" respectively. Additional details about the other elements shown in the FIGURE can be obtained by reference to the CCITT (now ITU) Draft Recommendation M.3010 entitled Principles for a Telecommunication Management Network. However, the TMN functional architecture can also be viewed as a complementary approach that is intended to be used mainly at the system management level.

The physical mapping of the TMN functions is relatively unconstrained as defined in the CCITT Draft Recommendation No. M.3010. This design flexibility can thus be used to optimize the cost-performance tradeoff. The reference points g 2301, f 2302, q 2303 and m 2304 shown in FIG. 23 are important, since they represent points in the system where information is required to be well-defined and thus accessible if desired through a physical interface.

Of these four standard sets of reference points, the q points 2303 are in a sense the most important, since they define the boundary between the managed world (i.e., a telecommunications system or network that is viewed as a structure of managed objects) and the management system.

Figure 24:
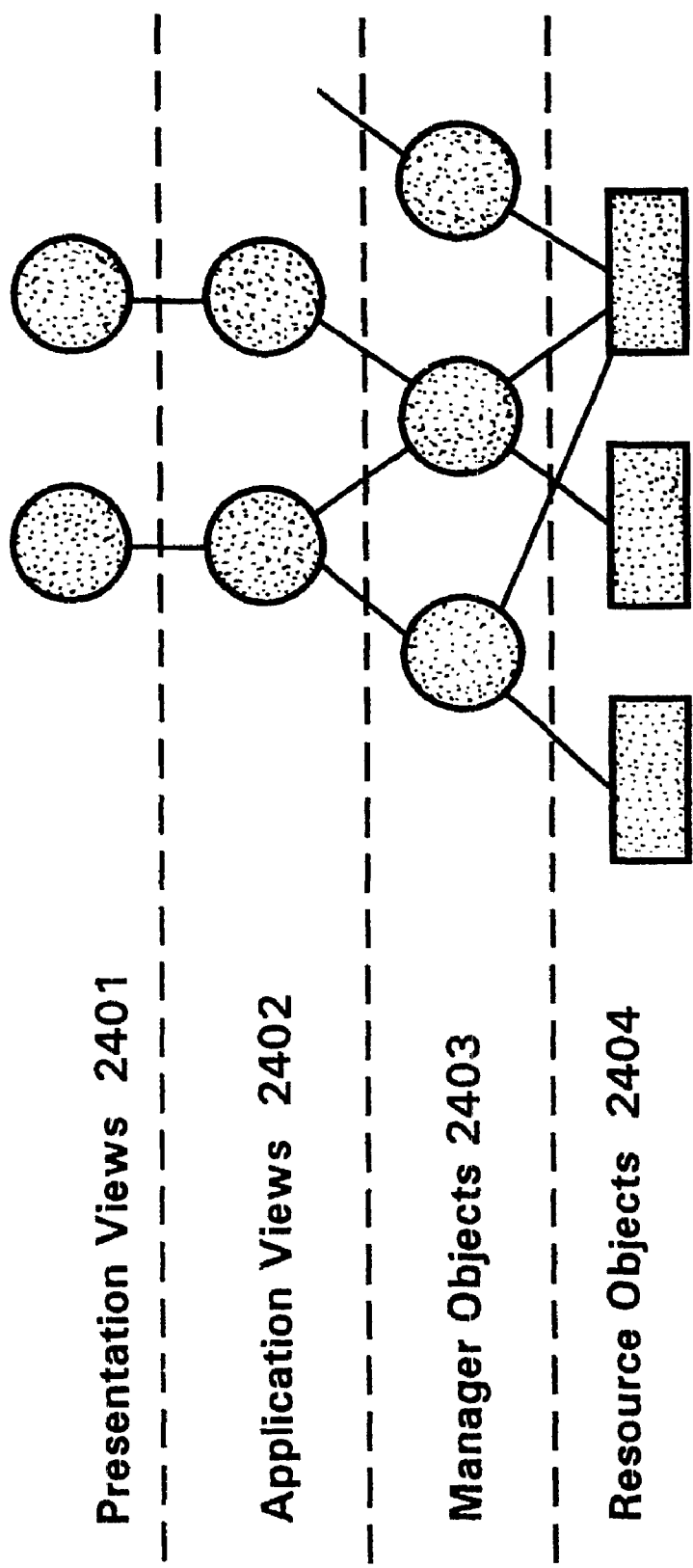
FIG. 24 illustrates that Presentation Views, Application Views and Managed Objects are all abstractions of real, physical or logical objects.

Managed objects are abstract views of real (physical or logical) network resources. These abstract views have a similar role to the instrument panel of a physical apparatus since they convey critical information in a simplified manner for management purposes. There may be more than one such management view of each real resource, e.g., a Network Element NE. The applications and the presentation functions that are used in the user interface will in their turn create composed and filtered views of these managed objects, as shown in FIG. 24. The Presentation Views 2401, the Application Views 2402 and the Managed Objects 2403 are all abstractions of real physical or logical network elements 2404.

A model of the managed information, i.e., a schematic (or class-oriented) view of the managed-object structure, is called an MIM (Managed Information Model) in TMN. The actual management information base is built hierarchically where the Managed Information Base (MIB) at the network level 2501 comprises a structure of managed objects each of which is a Network Element (NE).

Figure 25:
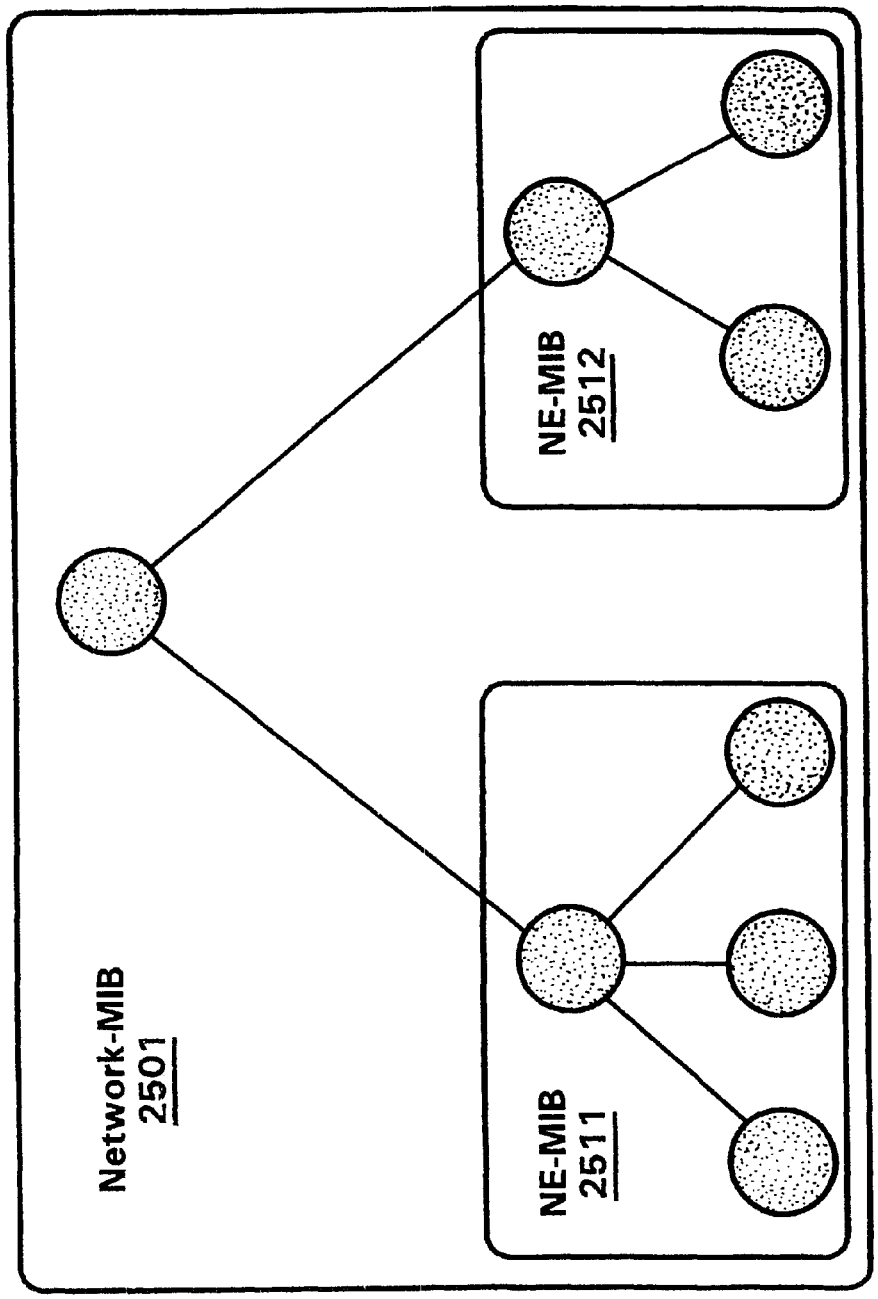
FIG. 25 is an illustrative depiction of the hierarchy of management information in a telecommunications under the TMN standard.

Further, each NE also comprises one or more MIBs 2511–2512 that describe managed objects and their structure, as depicted in FIG. 25. A comprehensive view of the Managed Information Model is thus created and the information contained therein becomes accessible indirectly by expanding the MIMs and the MIBs, level by level.

The management interface Q3 is a cornerstone of the TMN architecture and provides a way to achieve interoperability between OSS applications, along with a migration path towards TMN and also permits concurrent development. The management interface Q3 consists of four principal components:

An information base composed of objects classified as either managed objects (MO) or support objects (SO).

A protocol called the Common Management Information Protocol (CMIP) that provides a well-defined transport mechanism.

A plurality of services termed the Common Management Information Service (CMIS) that may be requested by a manager. These include: M-CREATE, M-DELETE, M-SET, M-GET, M-ACTION and M-EVENT-REPORT. Services directed toward specific MOs that require a certain behavior are termed service elements.

An Application Program Interface (API), that provides the language binding and which packs and unpacks information before and after transport using the CMIP protocol. An API may be specified and implemented in one of several ways, and using any of several different programming languages, such as IDL (Interface Definition Language) as defined by the Object Management Group (OMG).

Interoperability between applications and general resource objects (such as User Interface (UI) objects) can also be achieved in a distributed environment by using the ideas proposed by the Open Software Foundation's (OSF's) Distributed Management Environment (DME) architecture, which uses OMG's CORBA as an important component. See, OSF Distributed Management Environment (DME) Architecture, Review Copy (May 1992); OMG, Architecture Guide: The OMG Object Model (May 1992); and OMG, The Common Object Request Broker: Architecture and Specification (December 1991).

Figure 26:
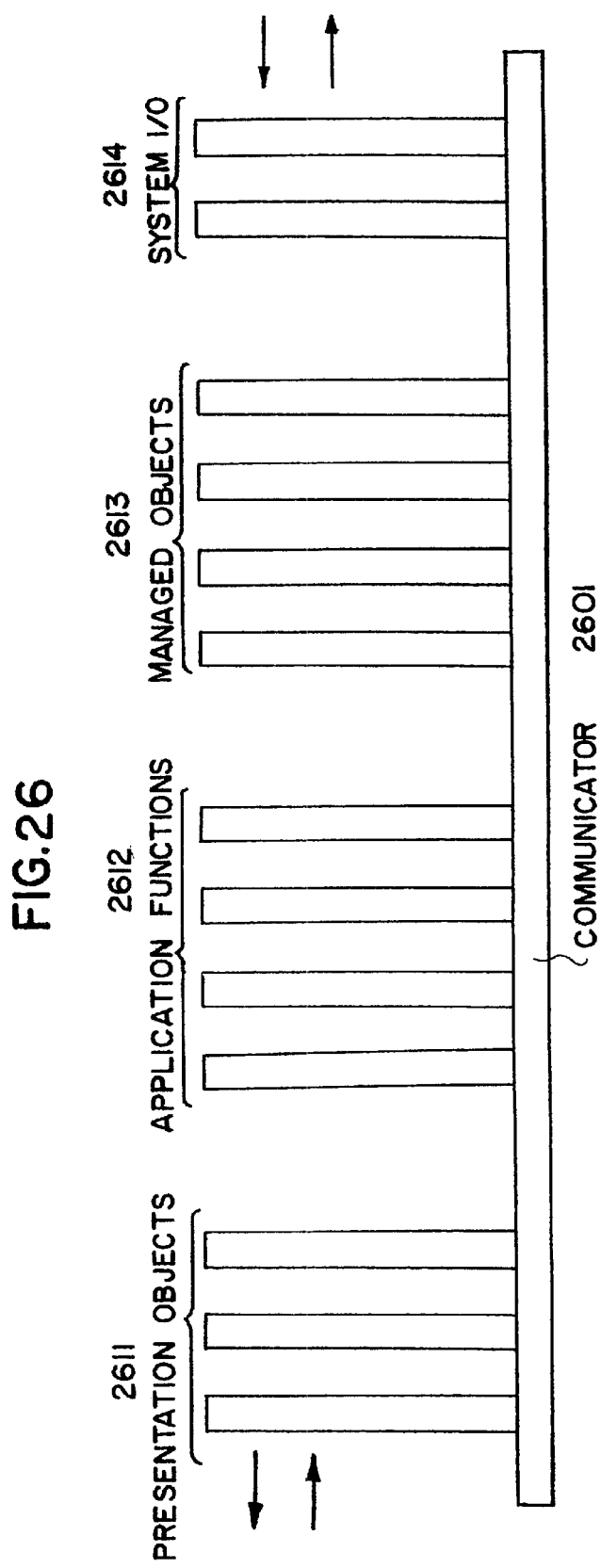
FIG. 26 illustrates the use of a software bus or backplane to achieve decoupling and interoperability at the application level between Presentation Objects, Application Functions, Managed Objects and System I/O.

The decoupling and the interoperability that can be achieved in this way, based on the use of a centralized switch object to regulate all inter-object communication as illustrated in FIG. 6 can also be realized as a software bus or backplane 2601, as shown in FIG. 26. Decoupling and interoperability can be achieved at lower levels in a similar, but less effective way, e.g., by using the techniques shown in FIGS. 6–9.

It should be noted that standardized managed object classes are not permitted to be changed or redefined under TMN because interoperability needs to be kept consistent. If necessary, new managed object classes have to be created instead, using TMN naming structures, wherever possible. These interfaces have to use standardized CMIS services and the data structures passed over the interface need to be suitable for being mapped to standard TMN MOs.

Figure 27:
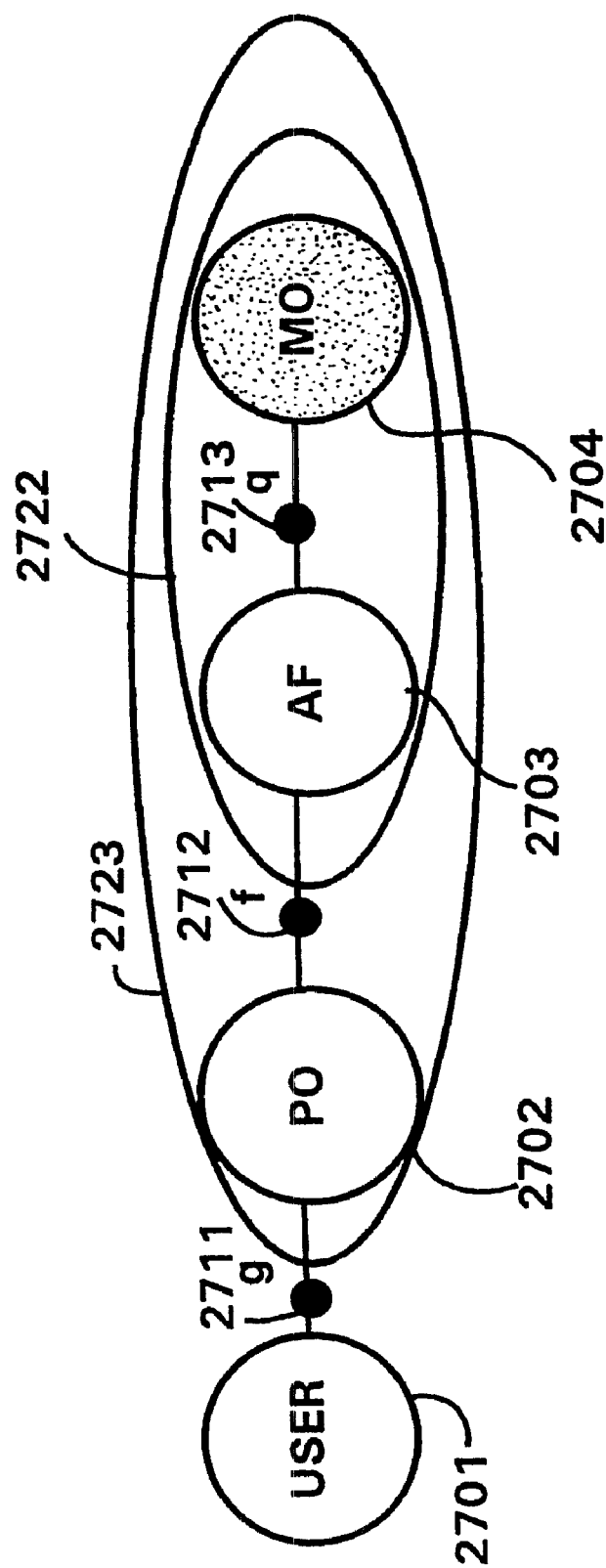
FIG. 27 illustrates the decoupling at the user interface level in the TMN architecture by definition of the g, f and q interface points between the user, the Presentation Objects, the Application Functions and the Managed Objects.

The manner in which information is presented (e.g., the placement, size, color, fonts, etc.) need to be easily changed by the end users. However, from the point of view of the application function objects supporting the user interface as well as the managed objects must be perceived as and actually remain stable. To permit easy adaptation to new requirements, changes in the requirements should principally impact the functions that hold the application together. The presentation objects and application functions thus work as agents that mediate between a user and the managed objects. As shown in FIG. 27, the role of an agent object is to isolate an object and make its working details opaque.

Ideally, a user must be allowed to navigate the managed-object information model (i.e, the information structure) with full visibility through a general object visualizer-handler or with limited visibility through specific applications and context-driven filters. After having obtained a clear picture of the managed object information structure, a user should then be permitted to apply functions or operations to, and receive notifications from, selected managed objects.

Penultimately, we address the fundamental questions as to whether object-oriented programming languages are really necessary and whether they are truly the best means for writing application functions and interface mappings. The reason for posing this provocative question arises from the fact that managed objects are specified with interface specification languages such as Abstract Syntax Notation One (ASN.1) (if guidelines set forth, e.g., in X-722, Guideslines for the Definition of Managed Objects (GDMO) are followed) while user-interface tools are often object-oriented with application-oriented interface definitions. These twin layers of managed objects and interface objects impose a framework of standards in the system. As such they are inflexible and hence to compensate flexible mappings must be used between these two object layers.

Given this context, the task of writing application functions, mediation functions and parts of Q-adapter functions can sometimes be carried out better using languages such as Erlang or other similar programming languages which support pattern-matching and a pattern-match event-triggered-rule evaluation. Erlang is a functional pattern-matching and event-driven language that is well-suited for fast prototyping. See, e. g., J. L. Armstrong, S. R. Virding & M. C. Williams, Concurrent Programming in Erlang (Prentice-Hall 1993).

Databases often serve the role of decoupling producers of information from users of information. Many systems also need to store persistent views of NEs (which are the managed resources) both as MOs (managed objects) which updated continually by notifications as well as different types of SOs for collecting historic and statistical information. To maximize system performance, such information should be stored as close to the managed objects as possible because that is where information regarding abstractions of the managed resources are maintained, e.g., in the QA or the MD. Of course, it should be noted that this is an implementation issue on which standards such as TMN provide a great deal of flexibility to the implementer.

The structure of managed objects, the fact that they are active and the type of information structures handled all suggest that it might be better to use an object-oriented database e.g., ObjectStore™ rather than a relational database. However, this issue has not been dealt with in detail in this patent application and is mentioned herein only to indicate to those skilled in the art that it would be fruitful to investigate this issue further to determine the effects of these choices upon the architecture.

As shown in this patent application, the principal impediment to achieving interoperability, modifiability, implementation-independence and the reuse of object-oriented software components is the excessive and/or strong coupling between objects.

As detailed above, the preferred solution to this problem involves adding an output port to each object and further making this additional port part of the object-oriented paradigm itself. Such a solution provides the lever of indirect addressing that is needed to manage the design requirements of interoperability, modifiability and implementation-independency.

Another solution to the decoupling problem includes requiring each object to address other objects only indirectly, such as by using specific interface objects. Several variants of this technique have been detailed, described and compared in the patent application. As shown above, each of these techniques may be applied in different parts, or at different levels, of a software system.

Although a preferred embodiment of the method and apparatus of the present invention has been illustrated in the accompanying drawings and described in the foregoing detailed description, it is to be understood that the invention is not limited to the embodiment(s) disclosed, but is capable of numerous rearrangements, modifications and substitutions without departing from the spirit of the invention as set forth and defined by the following claims.

What is claimed is:

1. In an object-oriented programming environment on a computer system comprising a processing unit, a memory unit, an I/O (input/output) unit and an operating system, a method for reducing the coupling between objects in said object-oriented programming environment comprising the steps of:

creating a plurality of objects, each of said plurality of objects having at least one input port and one output port;

selectively combining two or more of said plurality of objects to create one or more software program modules;

linking said one or more software program modules with each other and with the operating system of said computer system to create an executable software application program; and executing said software application program on said computer system, said step of executing said software application program further comprising the steps of:

processing all invocations of each object in said software application program through said at least one input port of said object, wherein, when an object receives a message, a function defined within the object will be invoked or an attribute value defined within the object will be accessed through said at least one input port of said object; and processing all interactions of each object in said software application program with other objects in said software application program, with other software application programs or with the operating system of said computer system through said at least one output port in said object, wherein a message from an object to said other objects, to said other software application programs or to said operating system is dispatched through said at least one output port of said object; and wherein said at least one input port of said object and said at least one output port of said object are sufficiently simple and tightly bound to said object so that neither said at least one input port nor said at least one output port possesses all the traits of an object.

2. The method of claim 1 for reducing the coupling between objects in said object-oriented programming environment wherein all of said objects that communicate with each other are peer objects.

3. The method of claim 1 for reducing the coupling between objects in said object-oriented programming environment wherein some of said objects that communicate with each other are client objects while the remaining objects are server objects.

4. The method of claim 1 for reducing the coupling between objects in said object-oriented programming environment wherein every object referred to by another object is handled as a variable and is replaced by specific references to instantiated objects at compile-time.

5. The method of claim 1 for reducing the coupling between objects in said object-oriented programming environment wherein every object referred to by another object is handled as a variable and is replaced by specific references to instantiated objects at run-time.

6. In an object-oriented programming environment on a computer system comprising a processing unit, a memory unit, an I/O (input/output) unit and an operating system, a system for reducing the coupling between objects in said object-oriented programming environment comprising:

means for creating a plurality of objects, each of said plurality of objects having at least one input port and one output port;

means for selectively combining two or more of said plurality of objects to create one or more software program modules;

means for linking said one or more software program modules with each other and with the operating system of said computer system to create an executable software application program; and means for executing said software application program on said computer system, said means for executing said software application program further comprising:

means for processing all invocations of each object in said software application program through said at least one input port of said object, wherein, when an object receives a message, a function defined within the object will be invoked or an attribute value defined within the object will be accessed through said at least one input port of said object; and means for processing all interactions of each object in said software application program with other objects in said software application program, with other software application programs or with the operating system of said computer system through said at least one output port in said object, wherein a message from an object to said other objects, to said other software application programs or to said operating system is dispatched through said at least one output port of said object; and wherein said at least one input port of said object and said at least one output port of said object are sufficiently simple and tightly bound to said object so that neither said at least one input port nor said at least one output port possesses all the traits of an object.

7. The system of claim 6 for reducing the coupling between objects in said object-oriented programming environment wherein all of said objects that communicate with each other are peer objects.

8. The system of claim 6 for reducing the coupling between objects in said object-oriented programming environment wherein some of said objects that communicate with each other are client objects while the remaining objects are server objects.

9. The system of claim 6 for reducing the coupling between objects in said object-oriented programming environment wherein every object referred to by another object is handled as a variable and is replaced by specific references to instantiated objects at compile-time.

10. The system of claim 6 for reducing the coupling between objects in said object-oriented programming environment wherein every object referred to by another object is handled as a variable and is replaced by specific references to instantiated objects at run-time.

* * * * *

UNITED STATES PATENT AND TRADEMARK OFFICE
CERTIFICATE OF CORRECTION

PATENT NO.    : 6,467,085 B2
DATED         : October 15, 2002
INVENTOR(S)   : Tony Ingemar Larsson It is certified that error appears in the above-identified patent and that said Letters Patent is hereby corrected as shown below:

Column 1,
Lines 11 and 22-23, replace "a Key to Improving" with -- A Key to Improving --
Line 12, replace "Architetures" with -- Architectures --
Line 29, replace "Coupling between" with -- Coupling Between --

Column 9,
Line 31, replace "may it-self be" with -- may itself be --

Column 12,
Line 5, replace "output part" with -- output port --
Line 66, replace "receivers$_1$" with -- receiver$_1$ --

Column 13,
Line 52, replace "then object o$_3$ and o$_2$" with -- then object o$_1$ and o$_2$ --

Column 17,
Line 41, replace "specificelements that are" with -- specific elements that are --
Lines 57-58, replace "specialized a applications," with -- specialized applications, --

Column 18,
Lines 63-64 replace "However, if then need" with -- However, if the need --

Column 22,
Line 10, replace "Guideslines for the" with -- Guidelines For The --
Line 55, replace "the lever of indirect" with -- the level of indirect --

Signed and Sealed this

Eleventh Day of March, 2003

JAMES E. ROGAN
*Director of the United States Patent and Trademark Office*